United States Patent
Gupta et al.

(10) Patent No.: US 11,016,816 B1
(45) Date of Patent: May 25, 2021

(54) COMPUTE CAPACITY ALLOCATION BASED ON MULTI-FACTOR ANALYSIS

(71) Applicant: Amazon Technologies, Inc., Seattle, WA (US)

(72) Inventors: Diwakar Gupta, Seattle, WA (US); Michael Phillip Quinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 15/831,268

(22) Filed: Dec. 4, 2017

(51) Int. Cl.
  *G06F 9/50* (2006.01)
  *H04L 29/08* (2006.01)
  *G06F 9/455* (2018.01)

(52) U.S. Cl.
  CPC ........ *G06F 9/5077* (2013.01); *G06F 9/45558* (2013.01); *H04L 67/02* (2013.01); *H04L 67/1004* (2013.01); *G06F 2009/45562* (2013.01)

(58) Field of Classification Search
  CPC .................................................. G06F 9/5077
  See application file for complete search history.

(56) References Cited

U.S. PATENT DOCUMENTS

| | | | |
|---|---|---|---|
| 10,108,517 B1* | 10/2018 | Efremov | G06F 11/301 |
| 2015/0120791 A1* | 4/2015 | Gummaraju | G06F 9/45558 707/823 |
| 2018/0139148 A1* | 5/2018 | Gamage | H04L 47/822 |

* cited by examiner

*Primary Examiner* — Charlie Sun
(74) *Attorney, Agent, or Firm* — Davis Wright Tremaine LLP

(57) ABSTRACT

A system and methods are disclosed for adding slots to a group of slots for instantiating compute instances. Compute capacity of a computing system of a plurality of computing systems is detected. A first slot and a second slot of the group of slots are determined based on compute instances instantiated on the computing systems. The first slot is associated with a first type of compute instance and the second slot is associated with a second type of compute instance. The first type of compute instance and the second type of compute instance have different computing resource values associated therewith. The first slot and the second slot are added to the group of slots for respectively instantiating the first type and the second type of compute instances.

20 Claims, 11 Drawing Sheets

COMPUTE CAPACITY ALLOCATION BASED ON MULTI-FACTOR ANALYSIS

BACKGROUND

Web-based computing and storage technologies may enable users, such as content providers and customers, to satisfy their computing needs on-demand, without the cost of purchasing, developing, and maintaining computing resources, such as computing systems and devices. Computing resources for network computing and storage may be provided by service providers who implement large-scale networks of computers, servers and storage drives to enable clients, including content providers, online retailers, customers and the like, to host and execute a variety of applications and web services. Adequately balancing user needs against efficiency and performance is a challenging and complex problem for providers of such web-based computing and storage services. On one hand, to optimize customer experience, service providers strive to maintain an appropriate supply of computing resources capable of satisfying user needs. On the other hand, it is inefficient and costly to stock an excess of computing resources to satisfy every possible user's needs. Moreover, users may become dissatisfied if a service provider cannot accommodate their needs in a responsive manner, or if the computer resources provisioned to a user experience interruptions or slowdowns.

BRIEF DESCRIPTION OF THE DRAWINGS

Various techniques will be described with reference to the drawings, in which.

DETAILED DESCRIPTION

Figure 1:
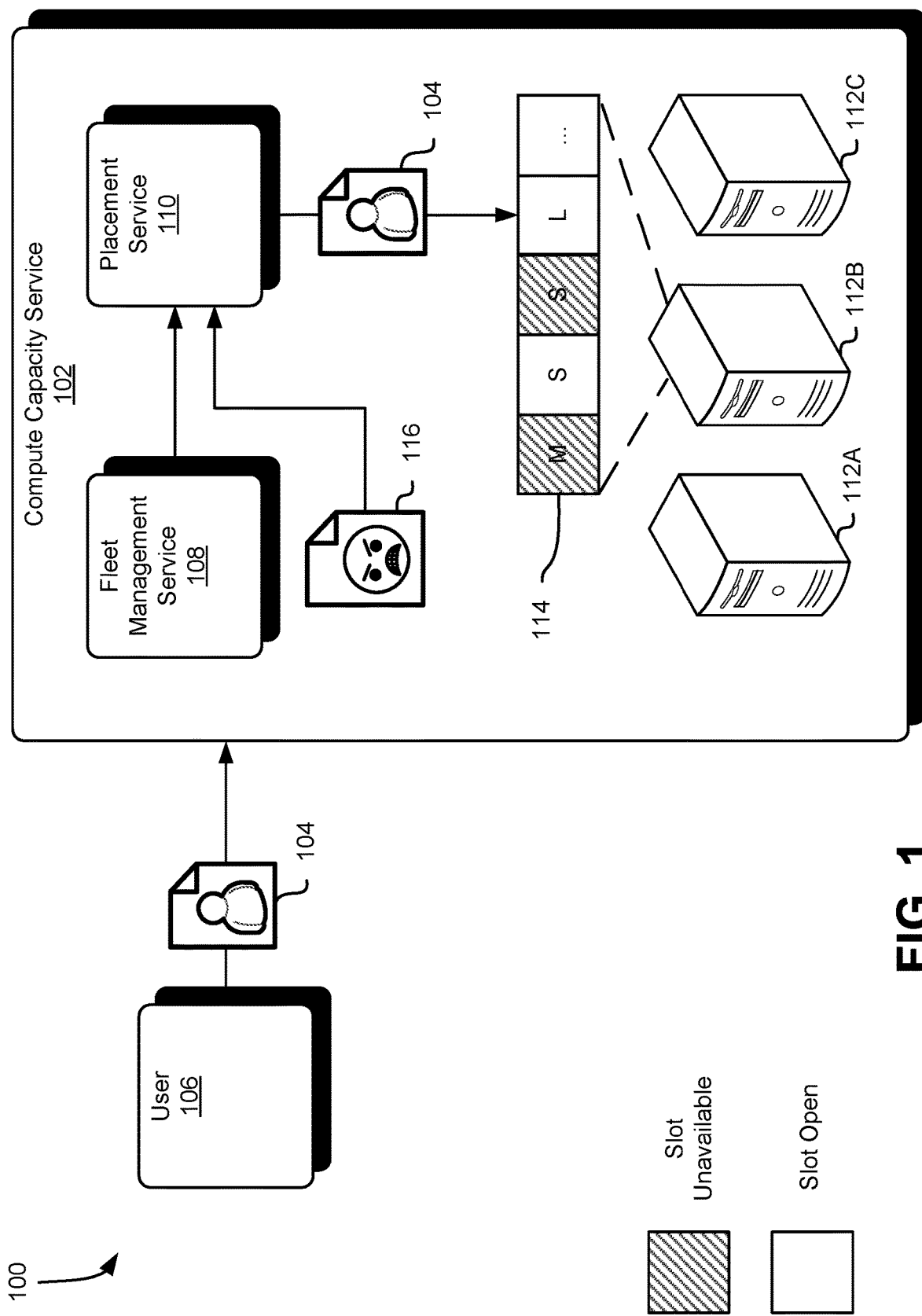
FIG. 1 illustrates an environment in which various embodiments of the present disclosure may be practiced.

Techniques described and suggested herein relate to methods, systems, and processes for managing compute capacity provided by a computing resource service provider to customers and assigning compute capacity slots to fulfill customer requests for compute capacity. The service provider may include an instance service that provides customers with compute capacity over a network. The compute capacity slots may correspond to computing resources of computing systems provisioned to be operated by the customer and having a set of computing resource attributes for performing one or more operations on behalf of the customer. The instance service may provision compute capacity with varying sets of computing resource attributes and corresponding amounts of computing resources, such as processing power, memory, data storage, and network bandwidth. The compute capacity may be organized into resource slots that can be provisioned in whole or in part to fulfill customer requests for computing resources. The compute capacity, as a result of being assigned to the customer, may be utilized to perform various computing operations on behalf of the customer. Multiple compute capacity slots can be organized into groups to execute computing operations in concert. A customer may send a request to the service provider to provision compute capacity (e.g., by instantiating an instance), and the slot request may include or be associated with a set of constraints on resource attributes and/or resource attribute amounts regarding the compute capacity slot to be provisioned.

A fleet management service of the service provider may operate as a background process to "build" computer systems of the service provider by assigning slots to the computer systems in a way that indicates target placements of compute instances. In some examples, the assignment of slots to a computer system is heterogeneous in that it contains multiple types of slots, such as various slots each corresponding to different instance types and/or instance families. In this manner, the fleet management service allocates a set of compute capacity slots having varying computing resource attributes and corresponding amounts of resources to be assigned to customers. The fleet management service may generate the target placements in a way that seeks to enforce a set of rules. The rules may be specific to a fleet of computing systems (e.g., rules specifying target characteristics of the fleet in regards to collective placements of compute instances), specific to a type of compute instance (e.g., preventing too many of the same type of slot from being assigned to the same computing system), and otherwise may affect the collective distribution of slots among computing systems of the fleet.

A placement service may receive customer requests to provision a compute capacity slot (e.g., requests to instantiate compute instances) and identify a set of candidate compute capacity slots satisfying a resource attribute constraint associated with the request. The placement service may obtain distribution information regarding allocated compute capacity slots of computing devices hosting the candidate slots. The placement service may perform an evaluation of the candidate slots using the distribution in formation to determine which of the candidate slots to assign fulfillment of the request. The placement service may generate a ranking of the set of candidate slots based on a set of factors associated with assigning fulfillment of the request to a compute capacity slot. The set of factors may include, for example, risk of a negative customer experience, efficiency of the assignment, opportunity cost of the assignment, and system performance risk. The placement service may also obtain customer information regarding customer usage of the instance service. The customer information may indicate the slots currently assigned to the customer, and information regarding past experiences of the customer with the instance service. As a result of obtaining customer information indicating that the customer has had one or more adverse customer experiences with the instance service, the placement service may select a compute capacity slot to assign fulfillment of the request that has a high likelihood of improving customer experience, such as a compute capacity slot of a computing device whose slots are unassigned.

The placement service may assign fulfillment of the request to a compute capacity slot based on a determination that the slot satisfies one or more conditions related to the set of factors. For instance, the conditions may be related to which compute capacity slot presents the lowest risk to customer experience and system performance, the highest efficiency in terms of computing resource utilization, and/or has the most positive effect on customer satisfaction. In some cases, due to the selection of candidate compute capacity slots allocated by the fleet management service, the placement service may be forced to make a suboptimal assignment to provision a compute capacity slot to the customer in a timely manner. For example, the placement service may be forced to make an inefficient selection of a compute capacity slot that has an amount of resource attributes exceeding the amount of resources that the customer requested. In response, the placement service may provide placement information to the fleet management service indicating that a suboptimal placement was made due to a poor selection of a compute capacity slot for fulfillment of the request.

Based on the placement information, the fleet management service may provision one or more compute capacity slots to remedy the deficient selection of compute capacity slots, such as by allocating one or more compute capacity slots having resource attribute amounts corresponding to the resource attribute amounts associated with the customer request. The fleet management service may notify the placement service of the additional supply of compute capacity slots. The placement service may, in response, reassign fulfillment of the request from the slot to one of the additional compute capacity slots to improve the efficiency of the instance service. The techniques described herein may facilitate an intelligent approach to assignment of compute capacity. A naïve approach may be to allocate a large number of compute capacity slots of different types and assign customers to the slots in the order received; however, this approach may result in an elevated risk of adverse customer experience, wherein numerous slots of a single computing device are assigned to a single customer. Accordingly, a system outage or spike in customer activity associated with resources of the computing device may cause an interruption or slowdown in service to the customer if numerous slots of the customer are assigned to a single computing device. The methods, systems, and processes described herein facilitate the distribution of risk and increase the efficiency associated with assigning fulfillment of customer requests to compute capacity slots.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an environment 100 in which remote compute capacity may be allocated for a user according to various embodiments described herein. A compute capacity service 102 may receive a request 104 over a network (e.g., the internet) from a user 106 to provision compute capacity. The compute capacity service 102 may be a service of a computing resource service provider that provides a variety of services to users (e.g., customers), who may communicate with the computing resource service provider via an interface (not shown in FIG. 1), such as a web services interface or any other type of user-operable interface. Although only the service 102 is shown in FIG. 1, the computing resource service provider may provide a variety of services to the users 106. Furthermore, each service may have its own interface and, generally, subsets of the services may have corresponding interfaces in addition to or as an alternative to a single interface for the computing resource service provider.

Communications from customers may include requests for causing the computing resources service provider to perform various operations in association with, or in addition to, provisioning of compute capacity slots 114. A slot, in an embodiment, is a unit of computing resource capacity, that is assigned to a computing system (also referred to as a computer system, a physical computing device, a droplet, a physical host, and by other terminology). Assignment of a slot to a computing system, in an embodiment, results in the computing system to be able to be used to instantiate a compute instance (also referred to as a computer system instance, a virtual computer system instance, a virtual machine, a virtual machine instance, or in other terms) by loading an image comprising computer-executable code onto the computing system and running the image. A slot may be said to be used, filled, closed, or unavailable if the slot has been allocated a compute instance (e.g., the slot has been used to instantiate a compute instance or designated to be used for instantiation of a specific compute instance). Similarly, a slot may be said to be unused, unfilled, available, or open if the slot has not been assigned a compute instance (e.g., the slot still has not been used to instantiate a compute instance or designated for instantiation of a specific compute instance). Slots may be categorized in various ways. In some examples, slots are categorized hierarchically. Each slot may, for instance, have a family (or family type). Slots in a family may have a specific instance type. As described in more detail herein, a computing system may have assigned multiple slots of multiple families and/or multiple types within a single family.

The service provider may make an application programming interface ("API") available to the user 106 to provision the compute capacity slots 114. The user 106 may make the request 104 via an API call to cause the service 102 to allocate or otherwise make a compute capacity slot 114 available to the user 106. The request 104 may include various information, such as user identification information (e.g., account identifier, user identifier), and information identifying resource attributes of a compute capacity slot 114. Examples of such resource attributes include an amount or computing capacity, an amount of memory, an amount of storage space, a framerate, applications or services associated with executing the customer workload or application, performance requirements of the customer workload or application, or any other constraint or requirement of the user workload or application, by way of non-limiting example. The request 104 may include or be associated with a workload comprising a set of operations provided by the user 106 to be performed. As indicated in FIG. 1 (and the other Figures), some slots may be unavailable for assignment to customers because they are already assigned or reserved, for example, whereas other slots may be available to be assigned to customers.

The service 102 may perform various operations to allocate the appropriate computing resources in response to receiving the request. The operations may include operations performed by a fleet management service 108 and a placement service 110 to allocate resources of a fleet of computing systems 112. The computing systems 112 (sometimes referred to as "physical hosts," "physical computer systems," "droplets," and other terminology) may each comprise sets of physical hardware configured to execute instructions for performing various computational operations such as data computation, data manipulation, data processing, and/or data storage, by way of non-limiting example. Resource vector information may be associated with the computing systems 112 indicating the amount of individual resources available in a computing system 112 to be allocated. The sets of physical hardware of the computing systems 112 may be organized into slots 114 of compute capacity each having a set of compute capacity resources available for allocation, as described below in greater detail. Assigning fulfillment of the request 104, as described herein, may include organizing the sets of hardware of one or more of the computing systems 112 into compute capacity slot 114 having a particular set of attributes. The slot 114 may have a set of resource attributes and corresponding values associated therewith. Moreover, the slot 114 may have an associated slot type that corresponds to a set of resource attributes and values, as describe below.

The fleet management service 108 may observe conditions in the fleet of computing systems 112 and manage the fleet's computing resources based on the conditions observed. In managing the computing resources of the fleet of computing systems 112, the fleet management service 108 may utilize a set of rules that define conditions that should exist in the fleet of computing systems 112, such as a distribution of compute capacity slots 114, numbers of each type of compute capacity slot 114 available, and/or ratios between types of computing capacity slots 114. The fleet management service 108 may specify, to the placement service 110, a type and number of compute capacity slots 114 available to be placed for fulfilling user requests for compute capacity slots 114, as described below in greater detail. The fleet management service 108 may generate compute capacity slots 114 asynchronously to requests for a compute capacity slot. Asynchronous generation may refer to generating the compute capacity slot 114 not in response or contemporaneously to user requests for compute capacity. For instance, the fleet management service 108 may allocate slots having various slot types and/or resource attributes without regard to whether a request was received to allocate such a slot type. The fleet management service 108, for example, may maintain a collection of allocated slots, wherein the composition of the collection is based on various factors, such as demand for particular slot types, distribution of slots allocated (e.g., assigned to users), and so forth, as described below.

Based on the availability of compute capacity slots 114 indicated by the fleet management service 108, the placement service 110 may make decisions regarding assigning fulfillment of the request 104 to a compute capacity slot 114 in association with user requests for compute capacity. Moreover, assigning fulfillment of the request 104 may further be based on other factors. In one embodiment, assigning fulfillment of the request 104 may be based on customer experience—for example, the placement service 110 may obtain information 116 indicating customer experience with the compute capacity service 102 and determine assignment of a request 104 based on the information 116. In one embodiment, assigning fulfillment of the request 104 may be based on distribution of compute capacity slots 114—for instance, determining assignment of a request 104 may be based on the network locations of compute capacity slots 114 and which computing systems 112 have existing or assigned slots for a given user. In one embodiment, assigning fulfillment of the request 104 to the compute capacity slots 114 may be based on resource utilization, such as realization information for the compute capacity slots 114 placed and realization information for a given user. As described herein, placement may also be based on receiving a customer request for compute capacity and the resource vector information associated with the fleet of computing systems 112.

Assigning fulfillment of the requests 104 may include assigning a slot type having a set of resource attributes associated therewith. For example, the placement service 110 may, based on receiving information from the fleet management service 108, may assign fulfillment of the request 104 to a computer system 112B. As described below in greater detail, the slot type may indicate various resources associated with a compute capacity slot 114D. The placement service 110 may, for instance, determine that resource vector information for the computing system 112B indicates that the system 112 has sufficient available resources to place a compute capacity slot in response to the request 104. Based on performing an analysis of the placement factors in association with systems 112 having sufficient available resources, the placement service 110 may determine to place the compute capacity slot 114D having the type "A2-L" on the system 112B. The placement service 110 may notify the fleet management service 108 of the placement, including information regarding the type placed and which computing system 112B the slot 114D was placed on. The fleet management service 108 may track various information regarding the fleet and the availability of computing resources therein, including how many of each compute capacity slot type has been placed, resource vector information of the fleet, and so on.

According to the methods, systems, and processes described herein, intelligent assignment of compute capacity slots provides numerous benefits. In one aspect, customer experience may be improved by identifying customers whose experience may have suffered by one or more previous slot assignments, and determining a slot assignment that would enhance their experience, or at least not cause their experience to further suffer. In one aspect, efficiency of the compute capacity service 102 may be improved by identifying placements that would, for example, enhance resource realization. In one aspect, network utilization may be enhanced, for example, by assigning slots according to network location. Those of ordinary skill in the art will appreciate that these and other benefits may be achieved in association with the present disclosure.

Figure 2:
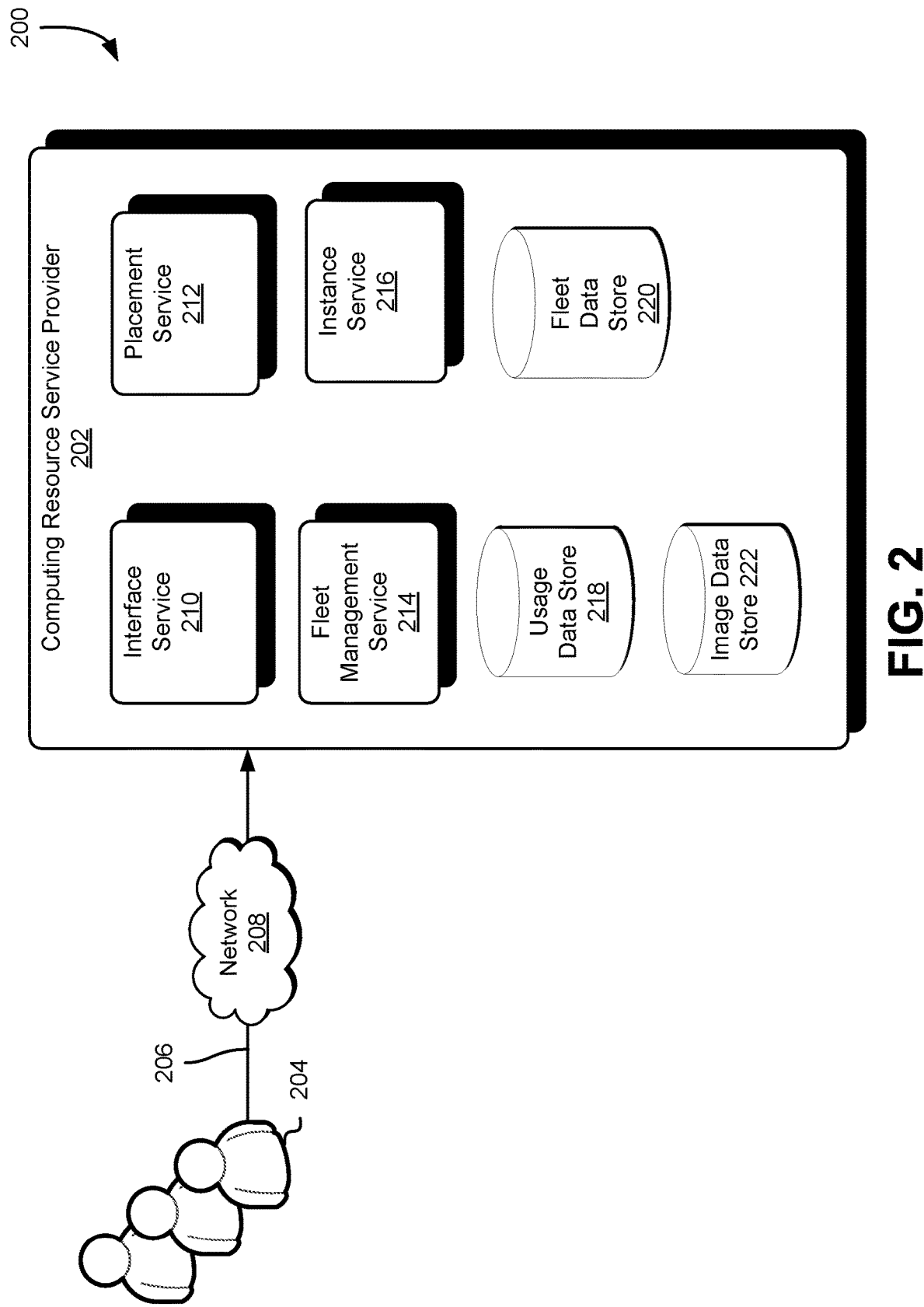
FIG. 2 illustrates a second environment in which various embodiments of the present disclosure may be practiced.

FIG. 2 shows an illustrative example of an environment 200 in which various embodiments of the present disclosure may be practiced. A computing resource service provider 202 may provide one or more services, including provisioning of compute capacity, to users 204. The users 204 may use one or more computing devices (e.g., personal computer, tablet, mobile device, server) to send requests 206, over a network 208, for compute capacity. The request 206 may include information identifying type and amount of computing resources to be provisioned, or may identify a type of compute capacity slot to be provisioned. For instance, the request 206 may include information identifying an amount of computing performance (e.g., number of operations per second) and data storage (e.g., RAM, ROM) to be provisioned, or identify a specific slot type ("A2-M") to be provisioned. The resource requirements, in some embodiments, are directly indicated in the request with indicators of each requirement and, in other embodiments, indicated indirectly, e.g., by indicating a slot type that has associated resource requirements. The network 208 may be an untrusted network configured for network communications over various distances, such as the internet.

The computing resource service provider 202 may comprise various services for fulfillment of the request 206. In one embodiment, the computing resource service provider 202 includes an interface service 210, a placement service 212, a fleet management service 214, service 216, a usage data store 218, a fleet data store 220, and an image data store 222. The service provider 202 may include other web-based services not described herein. Various services described or depicted may be included in, or separate from, other services. For instance, the placement service 212 and/or the fleet management service 214 may be part of the instance service 216, as shown in FIG. 1, or they may be separate services with which the instance service 216 communicates. One or more of the services may access the usage data store 218 and the fleet data store 220, as described herein.

The interface service 210, in an embodiment, is a computer system that facilitates communication between the users 204 and various computing entities of the service provider 202. The interface service 210 may comprise one or more proxy computing devices (e.g., servers) for distributing communications and data to the appropriate entities. The interface service 210 may provide or expose APIs to the users 204 to facilitate communication, and may receive API calls therethrough. The computer system of the interface service 210 may, for instance, comprise one or more processors and memory that stores executable instructions whose execution by the one or more processors causes the interfacing service 210 to perform operations described herein.

The instance service 216, in an embodiment, is a computer system that provisions compute capacity for fulfillment of user requests. Based on a request received from a user 204, or information associated with a user request, the instance service 216 may allocate one or more slots of one or more computing devices of the fleet according to information associated with the request. For example, the instance service 216 may receive a user request specifying or otherwise indicating, directly or indirectly, one or more resource attributes (e.g., number of operations per second, amount of memory, number of frames per second, network bandwidth) of a compute capacity slot to be provisioned to the user. In response, the instance service 216 may provision one or more slots that collectively fulfill the compute capacity attributes specified in associated with the request. As another example, the instance service 216 may allocate a slot having a slot type, or set of computing resources and corresponding resource amounts, specified in association with a user request. The instance service 216 may coordinate with the fleet management service 214 in association with allocation of the slot, such as by notifying the fleet management service 214 of the instantiation and the type/attributes of the slot. As described in greater detail below, allocating may refer to the process of setting aside compute capacity of a computing device of the fleet. Allocating may include instantiating a computer system instance, such as by loading an image for the instance to be executed on the slot of the computing device or by instantiating a virtual machine instance on the slot. The computer system of the instance service 216 may, for example, comprise one or more processors and memory that stores executable instructions whose execution by the one or more processors causes the instance service 216 to perform operations described herein.

The fleet management service 214, in an embodiment, is a computer system that tracks the state of the fleet of computing devices and causes adjustment of the state of the fleet based on information received from the placement service 212. The fleet management service 214 may store and obtain data regarding the fleet from the fleet data store 220, such as information regarding computing resource of each computing device and distribution information for the existing allocated slots. In one embodiment, the fleet management service 214 may cause a slot of a computing device to be allocated having a set of attributes (e.g., resource vector described below) based on the data regarding the fleet. The term slot, as referred to herein, may refer to an amount of computing resources corresponding to set of computing resources of a computing device that are reserved or set aside to be assigned to a user as a whole. The slot may be configured to host one or more virtual machine instances, applications, or other executable instructions to perform operations on behalf of the user. As discussed herein, a hypervisor or virtualization layer may be associated with each slot and be configured to manage resources of the slot.

The fleet management service 214 may also update compute resource information associated with the computing device on which the slot was allocated, and update distribution information of the slots to reflect the addition (or elimination) of each slot. Further, the fleet management service 214 may notify the placement service 212 regarding each slot generated or eliminated, including the migration of assignment of slots from one computing device of the fleet to another. The fleet management service 214 may receive information from the placement service 212 regarding slots assigned, as described below. The computer system of the fleet management service 214 may, for slot, comprise one or more processors and memory that stores executable instructions whose execution by the one or more processors causes the fleet management service 214 to perform operations described herein.

The fleet data store 220, in an embodiment, stores information regarding the state of the fleet of computing devices and information regarding slots assigned of the fleet. The state information of the fleet may comprise the available computing resources for each computing device of the fleet, identification information of the computing devices, network location information of the computing devices, by way of non-limiting example. The information regarding slots allocated may include distribution information of the slots allocated, attribute information of the slots (e.g., computing resources of each slot, slot type), and/or location information of the slots (e.g., network location, host address, physical location). The distribution information may indicate the distribution of slots by type or computing resource allocation, as described below. The fleet data store 220 may include data storage media capable of storing, accessing and retrieving data regarding the fleet of computing systems on which compute capacity slots may be allocated, and may include any combination and number of data servers, databases, data storage devices and data storage media, in any standard, distributed, virtual or clustered environment.

The placement service 212 is a computer system that assigns users to compute capacity slots allocated by the fleet management service 214. For example, the placement service 212 may select slots built by the fleet management service 214 that are to be used to instantiate instances for fulfilling a user request. The placement service 212 may receive an indication from the fleet management service 214 of compute capacity slots that it allocates. The indication may include identifying information of the slot, such as slot identifier, network location, identification information of the computing device hosting the slot, location information identifying the location of the slot within the hosting computing device (e.g., row number, computing device identifier), and information regarding the computing resources associated with the slot.

The placement service 212 may identify a set of candidate slots and assign users to one or more of the candidate slots based on assessment of various factors. Examples of factors which may be evaluated in the assessment may include one or more of customer experience, user association with the computing device hosting the slot, location information of the slot, and/or computing resources of the slot relative to the computing resources requested by the user. As a result of the assessment, the placement service 212 may determine one or more of the candidate slots with which to associate the user for fulfillment of the user request 206. Further, the placement service 212 may provide information to the fleet management service 214 regarding the placement to assist the fleet management service 214 in determining how to further allocate computing resources of the computing devices, as described below in greater detail. The computer system of the placement service 212 may, for instance, comprise one or more processors and memory that stores executable instructions whose execution by the one or more processors causes the placement service 212 to perform operations described herein. The placement service 212 may access information stored on the usage data store 218 and/or the fleet data store 220 to determine assignment of a user to a slot, such as by submitting a database query regarding computing devices, and/or users.

The usage data store 218 stores information regarding the users. The user information may facilitate making placement decisions that will improve efficiency and customer satisfaction. The user information may include information regarding customer experience, such as an indication of events associated with a user that may positively or adversely affect customer experience. The user information may also include data regarding the distribution of slots associated with the customer, such as the number and location of slots associated with the user. Other examples of customer information include realization metrics indicating how much of the computing resources the user typically uses versus how much computing resources are available to the user and usage data over time for each user. The usage data store 218 may include data storage media capable of storing, accessing and retrieving data regarding customers, and may include any combination and number of data servers, databases, data storage devices and data storage media, in any standard, distributed, virtual or clustered environment. The service provider 202 may further include an image data store 222 storing virtual machine images that, as a result of being loaded onto one of the slots, causes the computing resources associated with the slot to instantiate a virtual machine. Some virtual machine images may correspond to a particular virtual machine instance optimized for running on a slot having a certain instance type.

Figure 3:
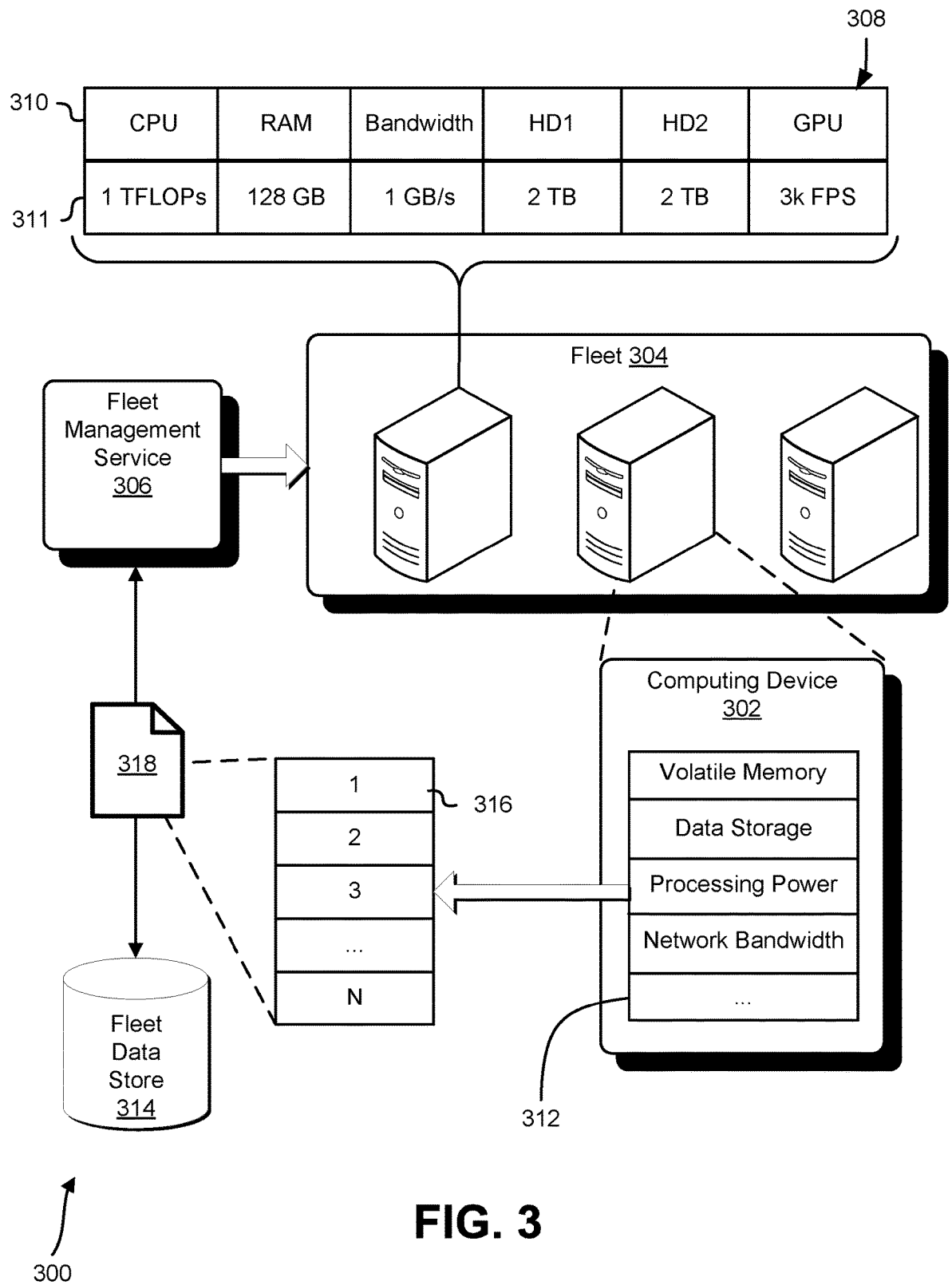
FIG. 3 illustrates an environment in which a fleet management service manages compute capacity resources of a set of computing devices according to various embodiments.

FIG. 3 illustrates a diagram 300 of information associated with a computing device 302 of a fleet 304 of computing devices according to various embodiments described herein.

Each computing device 302 of the fleet 304 of computing devices may comprise a set of hardware including processors, such as a central processing unit (CPU), a graphics processing unit (GPU) or a digital signal processor (DSP), memory, including static and dynamic memory, buses and input and output ports that are compliant with any handshaking, communications, or data transfer protocol. The set of hardware may also include storage devices, such as storage disks and tapes, networking equipment, and the like. The fleet of computing devices may correspond to computer hardware devices that are useable to allocate computing resources. In one embodiment, the computer hardware devices are server computers installed in positions of server racks, such as an open position in a hardware rack of a server. In one embodiment, the servers can be used to host virtual machine instances. In an embodiment, a virtual machine instance is an instance of a software implementation on a computing device that executes programs like a physical machine. The computing devices may include hardware for implementing types of computing resources, such as storage devices, virtualized storage devices, networking devices, and the like. Additionally, the implemented computing resources may be managed by customers of the computing resource service provider.

An available resource vector 308 or other indication of an amount of each of a plurality of resources to allocate for a virtual machine may be provided to a server when instructing the server to provision the virtual machine instance and assign it the amount of resources in the vector 308. The available resource vector 308 corresponds to computing resources 312 of the associated computing device 302 that can be allocated to one or more instances. In particular, the available resource vector 308 of a computing device 302 that has all of its allocable resources available (i.e., does not have computing resources assigned to a customer) may indicate the entire allocable compute capacity of the computing device 302. By contrast, the available resource vector 308 of a computing device 302 may indicate the remaining resources available for allocation where some of the computing resources of the computing device 302 have been allocated to one or more slots, as described below. The available resource vector 308 may be a collection of information stored in data storage, such as the fleet data store 314 described herein, and may be associated with identification information of the corresponding computing device 302. The available resource vector 308 may have a set of resource attributes 310 and a value 311 corresponding to each of the resource attributes. The resource attributes 310 may include attributes corresponding to a metric for compute resource (e.g., number of flops, number of cycles per second) corresponding to the amount of available processing power, volatile memory (e.g., RAM), network bandwidth, non-volatile memory, and a metric for graphics rendering capacity (e.g., frame rate).

The fleet management service 306 may organize resources 312 of one or more of the computing devices into one or more slots 316. The slots 316 are constructs maintained by the fleet management service 306 to track how the resources 312 of the computing devices 302 have been reserved. Each of the slots 316 may correspond to a collection of the resources 312 that the fleet management service 306 has reserved for instantiating a virtual machine instance. The amount and type of computing resources corresponding to a slot 316 may be based on a slot type designated for the slot 316. For example, a slot type of "A2-L", may correspond to an amount of compute capacity (e.g., CPU performance metric), memory (e.g., RAM), data storage (e.g., ROM), and network bandwidth, whereas slot type of "A1-M" may correspond to a different amount of compute capacity, memory, data storage, and network bandwidth.

The slots 316 maintained by the fleet management service 306 may not actually allocated in the computing devices 302 as a result of being identified as a "slot", but may instead be organized in data storage (e.g., RAM, ROM) of the fleet management service 306 as resources that are available to be allocated in the computing device 302 in response to a request to instantiate a virtual machine instance for which a set of resources are needed to operate the virtual machine instance. For example, the fleet management service 306 may maintain a record 318 of slots 316 that the fleet management service 306 has reserved from the available resources 312 of the computing devices 302. In one embodiment, as a result of generating a slot 316 using resources 312 of a computing device 302, the resource vector 308 of the computing device 302 may be modified to reflect that the resources 312 available of the computing device 302 have been reduced. Although a slot 316 of a computing device 302 has been designated by the fleet management service 306, the logical or physical organization of the resources 312 of the computing device 302 corresponding to the slot 316 may not be modified. Moreover, the computing device 302 may not maintain or have a record of the slots 316 that the fleet management service 306 has determined for it.

As a result of creating one or more slots 316, the fleet management service 306 may notify the placement service that the slots 316 are available to instantiate a virtual machine, as described herein. The fleet management service 306 may make the record 318 available to the placement service, or notify the placement service regarding the creation of the slots 316, such as by providing information to the placement service regarding a number, type, or location of slots 316 created. The placement service, as described herein, may decide to instantiate a virtual machine instance on one or more of the slots 316 as a result of receiving a request. The placement service may send a request to the fleet management service 306 to instantiate a virtual machine instance on a particular slot 316. The fleet management service 306 may then allocate the resources of the computing device 302 and cause a virtual machine instance to be instantiated on the allocated resources, such as by sending a control signal to the computing device 302 including a resource vector for amounts of resources to be allocated for the virtual machine and including a signal causing a virtual machine of a particular type to be instantiated using the resources allocated.

The type of slots 316 that the fleet management service 306 creates may be determined as a result of criteria for managing the fleet 304. The criteria may include various factors and metrics that should be satisfied, such as a number of particular slot types that should be kept available. The slots 316 may be created, modified, or eliminated as necessary according to the criteria. The fleet management service 306 may create or modify the slots 316 without modifying the actual organization of computing resources 312 of a computing device 302. The creation of a new slot may, for example, cause information corresponding to a computing device 302 for the slot 316 to be updated to reflect that the slot has been added. The fleet management service 306 may modify the slots 316 in various ways, such as by readjusting an amount of resources corresponding to a slot 316, splitting a slot 316 into two or more smaller slots, or merging two or more slots 316 into a larger slot, by way of non-limiting example. The fleet management service 306 may freely modify the slots 316 without affecting or interfering with virtual machines already instantiated.

Figure 4:
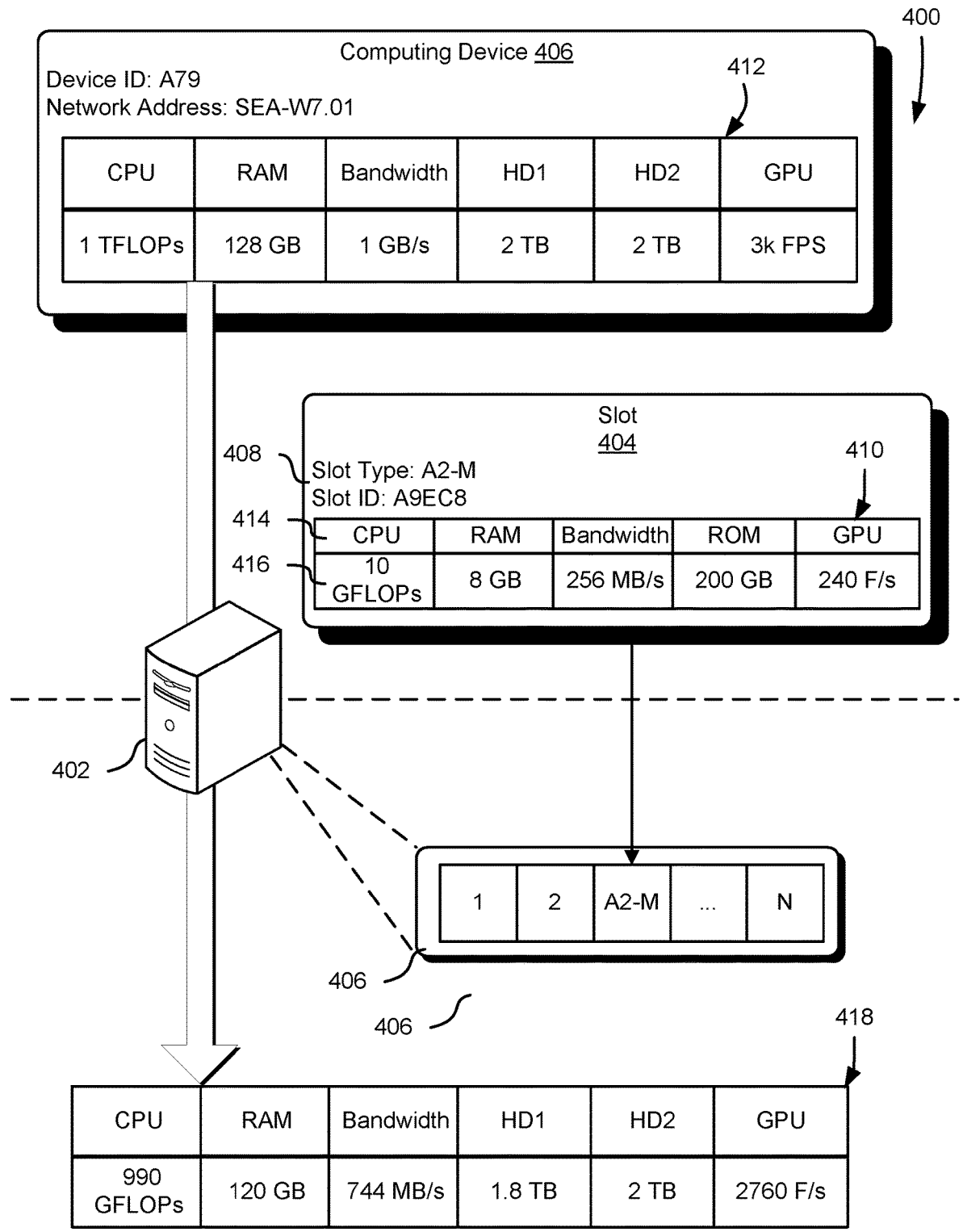
FIG. 4 illustrates an environment in which a compute capacity slot is allocated on a computing device of a computing resource service provider in accordance with an embodiment.

FIG. 4 shows a diagram 400 depicting instantiation of a compute capacity slot on a computing device according to various embodiments described herein. A fleet management service, as described herein, causes a compute capacity slot 404 to be allocated on a computing device 406 of the fleet of computing devices described herein. The slot 404 may be allocated on one or more sets of hardware installed in the computing device 402—for example, the slot 404 may be allocated on a hardware set installed at a particular location of a server computer, such as a particular set of hardware (e.g., chipset, memory set) connected to a slot or port of the server computer. Slot information 408 may be associated with the slot 404 to identify various aspects thereof. Examples of the slot information 408 include an identifier of the computing device 406 (e.g., host identifier, host address), a location identifier of the slot 404 within the computing device 406 (e.g., port number, slot number), a network identifier of the slot 404 (e.g., network address), type information identifying the type of the slot 404, and identifier of the slot 404.

A resource vector 410 may also be associated with the slot 404. The slot resource vector 410 indicates a set of resource attributes 414 and a value 416 corresponding to each of the resource attributes. The resource attributes 414 indicate a type of resource that is allocated to the slot 404, such as a metric for compute resource, memory, data storage, network bandwidth, and a metric for graphics rendering. The value 416 associated with each of the resource attributes include a number, portion, percentage, or other metric indicating an amount of each respective resource attribute that the slot 404 may consume or use. The value 416 may be an approximate amount that the slot 404 may temporarily exceed in some circumstances. The resource attributes 414 and the corresponding values 416 may correspond to a particular type of slot. For example, the type information of the slot information 408 may identify a slot type (e.g., "A2-M") that corresponds to a set of resource attributes and values for the resource attributes that a slot having the slot type may consume or use. Individual instance or slot types may correspond to collections of computing resources optimized for a particular category of use—for instance, to be used for applications requiring a large amount of memory and a small amount of processing power. That is, different instance types may correspond to different mixtures of computing resources for different applications (e.g., "A1", "A2", "B1", "F3", "D4"). The instance type may correspond to a particular hardware family. Each slot may be further classified by a size type indicating a relative size or amount of computing resources compared to other size types of an instance type. For instance, a slot type of "A2-M" may indicate a slot type having a resource profile corresponding to the resource vector 410 discussed with respect to FIG. 4. By comparison, a slot type of "A2-S" may have a similar proportion of computing resources to the resource vector 410, but may have a smaller amount of each individual computing resource. In one embodiment, however, the resource vector 410 for the slot 404 may not be associated such that the resources of the slot 404 may be customizable.

The slot information 408 may be stored in a fleet data store, as described herein, that is accessible to the fleet management service. The slot resource vector 410 may also be stored in the fleet data store and may be indexed such that information of the slot resource vector 410 may be retrieved in association with identification information of the slot 404—for example, resource information of the slot 404 may be retrieved from the fleet data store using a query having identification information of the slot 404 as a parameter. As another example, information regarding a set of allocated slots of a particular computing device 406 may be retrieved from the fleet data store. This may facilitate efficient data retrieval, synthesis, or processing of distribution information regarding the distribution of slots allocated on the fleet of computing devices. The fleet data store may include distribution information of the slots, such as number of a type of slots allocated, a number of a type of slots assigned to customers, total number of slots on each computing device, and/or a number of vacant locations or positions available in each computing device, by way of non-limiting example. The distribution information may associate user identification information with various information regarding slots, such as computing device identifiers, slot identifiers, and slot type information.

An available resource vector 412 of the computing device 402 may be modified based on instantiation of the slot 404 on the computing device 402. The available resource vector 412 may be modified by deducting the resource attributes and corresponding values corresponding to the type of the slot 404 from the current available resource vector. In particular, the available resource vector of the computing device 402 may correspond to the available resource vector 412 having no slots allocated thereon, as described above with respect to FIG. 3. After instantiating the slot 404, the corresponding values of the resource attributes 410 of the slot 404 may be deducted from the available resource vector. The compute capacity metric ("CPU") may be reduced to 990 GFlops from 1 TFlop as a result of the 10 GFlop compute capacity resource attribute value of the slot 404. The amount of available memory ("RAM") may be reduced to 120 GB from 128 GB as a result of the memory resource attribute value of the slot 404. The amount of available data storage of the computing device 402 may be reduced—for example, the amount of available data storage on the data storage partition HD1 may be reduced to 1.8 TB from 2 TB. Conversely, the amount of available data storage on the data storage partition HD2 may not be reduced. An updated available resource vector 418 of the computing device 402 may be determined and stored on the fleet data store described herein. The updated resource vector 418 corresponds to the available resource vector 412 less the respective resource attribute 410 values of the slot 404.

Figure 5:
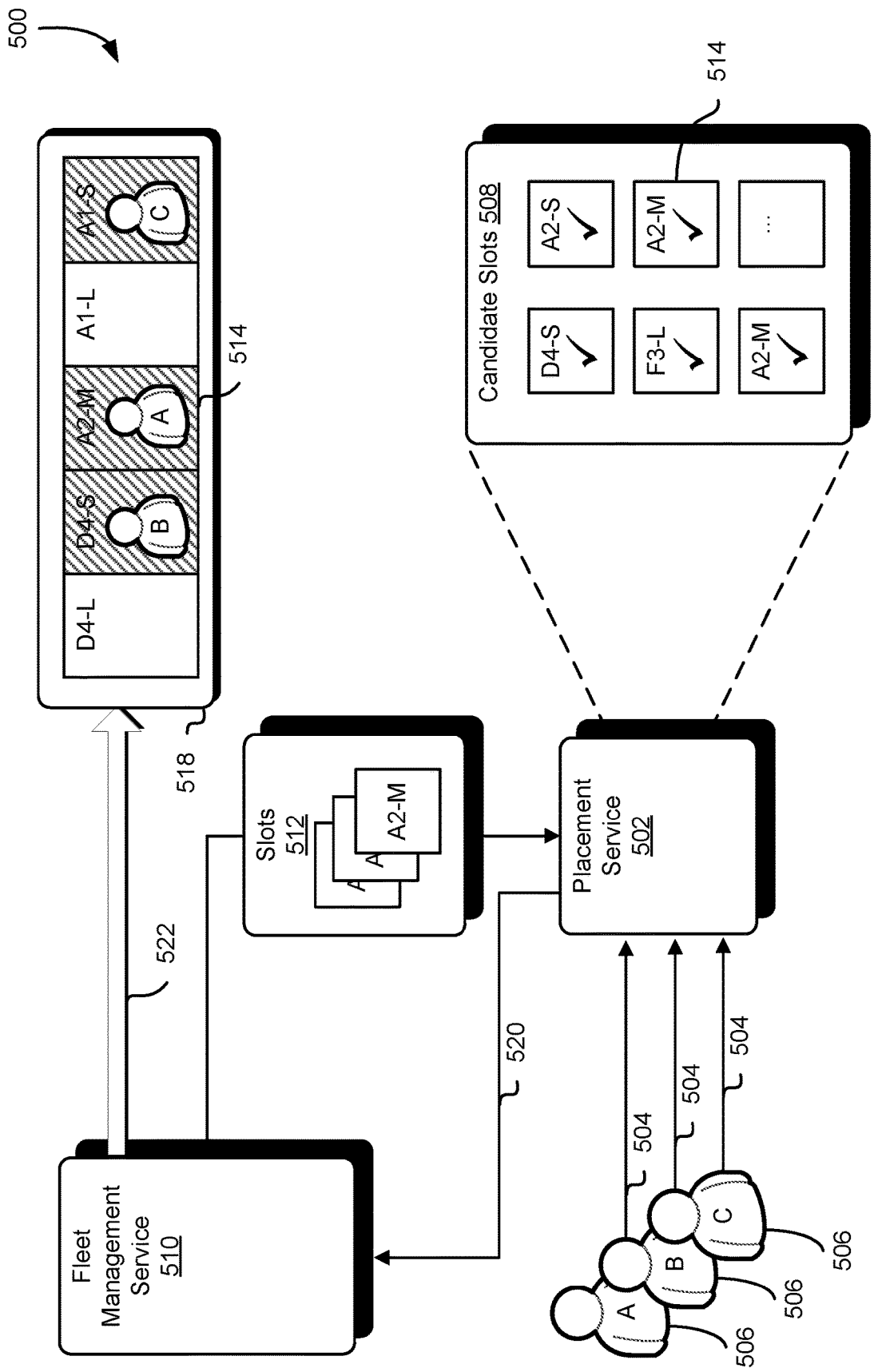
FIG. 5 illustrates an environment in which a placement service assigns a slot of a set of candidate compute capacity slots to fulfill a customer request in accordance with an embodiment.

FIG. 5 shows an environment 500 in which user requests may be assigned for fulfillment to a slot of a computing device according to various embodiments described herein. A placement service 502 receives one or more requests 504 of one or more customers 506 (e.g., users) to allocate a compute capacity slot. A job, such as a set of operations, may be associated with or identified by the requests 504 such that the requests 504 may be fulfilled at least in part by performance of the job. Assigning the requests 504, as described herein, may correspond to assigning the job to be performed by a computer system instance on one or more slots. In one embodiment, the requests 504 may include, or be associated with, information regarding a constraint on a slot to be assigned for fulfillment. For example, the constraint may be a constraint on a type of slot to be allocated for fulfillment of the associated request 504. As described above, the type of slot may correspond to a set of resource attributes and corresponding resource amounts that a slot of that type may consume or use. The constraint may be on a set of resource attributes and corresponding resource amounts for the resource attributes to be assigned for fulfillment of the request 504. The request 504 may be received from the customer 506 or from an intermediary, such as the interface service described above with respect to FIG. 2. The request 504 may include a request for a plurality of compute capacity slots having one or more instance types. The placement service 502 may assign the customer to a plurality compute capacity slots to fulfill the request 504.

A fleet management service 510 may create one or more slots 512 on one or more computing devices 518. As described herein, creating a slot 512 may correspond to reserving an amount of resources of a computing device by maintaining a record of the resources that have been allocated of a computing device. The fleet management service 510 may monitor the overall fleet of computing devices and slots thereof to determine whether to create new slots and which types of slots to create based on criteria related to the fleet and customer experience. The fleet management service 510 may maintain a heterogeneous collection of slots 512 allocated on individual ones of the computing devices 518 such that different slot types may be allocated on a single computing device. For instance, the computing device 518 has a A1-L and A1-S indicating that different slot scales (e.g., Large, Small) are allocated corresponding to a hardware set of a single slot type (e.g., A1) on the computing device 518. Moreover, different slot types and slot scales may be allocated on a single computing device 518. The computing device 518 includes, for slot, D4, A2, and A1 slot types, and various slot scales corresponding thereto. Each slot type may be configured toward fulfilling workloads of certain use cases. Some slot types may be better suited in uses for which a large amount of memory is preferred whereas other slot types may be better suited for compute processing-intensive uses requiring a large amount of processing power. Allocating a heterogeneous collection of slot types and scales allows a service provider to provide a wide variety of compute capacity slots with a high degree of performance and efficiency.

Allocating a slot 512 by the fleet management service 510 may include writing information to the fleet data store regarding allocation of resources of the corresponding computing device for the slot 512. For example, the fleet management service 510 may write information to the fleet data store reserving resources of a physical host on which the slot 512 is allocated. The fleet management service 510 may not modify the configuration of the physical host, such as by partitioning memory or data storage, or reserving computing cycles; instead, the allocation may be an operation to update a record in memory of the fleet data store of reserved computing resources of the physical host in the fleet data store. The resource allocations may be provisional allocations tracked by the fleet management service 510, such that the resources may be reallocated without changing the configuration of the physical hosts. The fleet management service 510 may allocate the slots based on projected needs of customers, such as a determination that a number of a certain instance type should be maintained to meet customer demand for the instance type. Allocation of the slots may also be based on meeting criteria associated with the set of factors described herein, such as maintaining an appropriate population of slots to ensure customer satisfaction. The management service 510 may operate on a control plane on which resources of the physical hosts may be modified, controlled, and allocated. By contrast, the placement service 502 may operate on another network architecture plane, such as the data plane.

The placement service 502 may determine a set of candidate slots 508 allocated on one or more computing devices by the fleet management service 510 that have resource attributes and corresponding values that satisfy the type of slot or resource attributes of the request 504. For instance, the request 504 may request allocation of a slot of a particular type, such as "A2-M", or a slot having a particular set of resource attributes and corresponding values. The placement service 502 may determine a set of candidate slots 508, from a set of slots allocated 512 by the fleet management service 510, that satisfy the type of slot or resource attributes requested. For instance, in response to a request 504 specifying a "A2-M" slot type, the placement service 502 may determine a set of candidate slots of the allocated slots 512 that are of the "A2-M" type, or allocated slots 512 whose resource attributes and corresponding values are comparable (e.g., a slot possessing at least the resource attributes of the slot type and have corresponding values equal to or greater than the slot type) to the resource attributes and corresponding values of the requested slot type. Each of the candidate slots may be assigned to a corresponding computing system. The placement service 502 may obtain information regarding the set of allocated slots 512 from the fleet management service 510 or from the fleet data store described herein.

The placement service 502 may perform an assessment of the set of candidate slots 508 to determine which candidate slot to assign fulfillment of the request 504. In assessing the set of candidate slots 508, the placement service 502 may consider various factors, such as customer experience, distribution of the candidate slots, and utilization of the computing devices associated with the candidate slots. Customer experience may refer to a metric indicating the experience of the customer with respect to performance of the instance service, such as the frequency or number of outages or slowdowns experienced by the customer 506 or the frequency or number of uninterrupted periods of service experienced by the customer. The distribution of candidate slots may refer to a number of slots associated with the customer 506 that are allocated on individual ones of computing devices hosting the candidate slots. Computing device utilization may refer to the portion or percentage of each computing device hosting the candidate slots that are assigned to customers. These and other factors associated with the assignment decision are discussed below in greater detail. The placement service 502 may obtain information from the usage data store and fleet data store (or fleet management service 510) to use in assessment of the candidate slots. The information obtained may include customer experience information, slot distribution information, and/or utilization information. The assessment performed by the placement service 502 may include generating a ranking of the set of candidate slots based on one or more of the factors discussed herein.

In one embodiment, the various factors are input into a heuristic function that is used to score the candidate slots. As an illustrative example, a vector may be constructed where the components indicate whether the slot satisfies a corresponding constraint. For instance, a component of the vector may have a zero if the slot does not satisfy a corresponding constraint and a one if the slot does satisfy the corresponding constraint. In an illustrative example, the component, if corresponding to distribution, may contain a zero if the slot is assigned to a computing system on which the customer that submitted the request already has a compute instance instantiated and may contain a zero if the slot is assigned a computing system that has no compute instances of the customer. Components of the vector may be able to take on other possible values. For instance, continuing with the component corresponding to distribution, the value of the component may be the number of compute instances of the customer running on the computing system or a sum of values where each instance type has a corresponding value that correlates with resource usage (e.g., a "large" of a family type may get a higher number than a "medium" of the family type which may get a higher number than a small of the family type). As another illustrative example relating to customer experience, if a flag stored in association with the customer indicates that the customer has had a poor experience, a corresponding component in the vector may be (or otherwise based on) the number of slots of the computing system that are empty, which may be a weighted sum where weights correspond to instance types. In this manner, the more slots of a computing instance are filled, the less likely a slot of that computing instance will be used to fulfill the request (i.e., to ensure that the customer's instance is instantiated on a computing system with as much unused resources as possible to prevent additional negative experiences. In this example, the vector may be used as or otherwise in a heuristic. For example, the score may be a sum of the squares of the components of the vector, which may be a weighted sum where weights are used to influence how respective factors influence the score.

Based on the assessment, the placement service 502 may select a slot 514 of the set of candidate slots 508 to be assigned to fulfill the request 504. The placement service 502 may assign the customer 506 to the slot 514 causing the slot 514 to be unavailable. The placement service may indicate that the selected slot 514 is unavailable to fulfill other user requests, such as by notifying the fleet management service 510 of the assignment or by causing information in the fleet data store to be updated to indicate that the slot 514 is assigned to the customer 506 and therefore unavailable (unless the slot 514 otherwise determined to be a candidate for migration to another computing device). Information associated with the computing device 518 on which the selected slot 514 is being located may be generated or updated in response to the assignment, including information indicating customers assigned to the computing device 518 and resource vector information of the computing device 518.

The placement service 502 may cause the configuration of the physical hosts to be modified in response to the assignment of the customer 506 to the slot 514. A virtual machine instance may, for example, be instantiated on the slot 514 utilizing memory, data storage, and/or processing capacity of the physical host corresponding to the slot 514. The placement service 502 may notify the management service 510 of the assignment. In response, the management service 510 may record the resources of the physical host corresponding to the slot 514 as being occupied. The resources for the allocated slot 512 corresponding to the selected slot 514 may be recorded in the fleet data store as being in use, and no longer available to be reallocated without reassigning the customer. The fleet management service 510 and the placement service 502 may work in concert to reassign customers, reallocate slots, and manage computing resources to optimize customer satisfaction and system performance. Criteria for system performance and customer satisfaction may be determined and evaluated according to the set of factors described herein.

The placement service 502 may, based on the evaluation associated with the placement, provide placement information 520 back to the fleet management service 510 regarding the assignment. The placement information 520 may indicate, for example, that a slot type of A2-M was assigned to a location on the computing device 518. The placement service may evaluate the quality of the assignment of the customer 506 to the slot 512 based on various factors and provide result information of the evaluation to the fleet management service 510. For instance, the placement information 520 may indicate that the assignment was suboptimal due to one or more factors. One of the factors may be the sufficiency of the slots that were available to assign for fulfillment of the customer request. In assigning the slot, it is efficient to assign the request 504 to be fulfilled by the type of slot requested (or most similar to the resource attributes specified in the request). If the requested slot type is unavailable, the placement service 502 should assign the request 504 to be fulfilled by the next most similar type of slot available that can fulfill the request 504. For instance, if a "A2-M" is requested, but unavailable, the placement service 502 determines that the next best slot assignment is to an available "A2-L", which has the same resource attributes and has corresponding attribute values larger than the resource attributes requested. The placement service 502 may provide placement information 520 to the fleet management service 510 indicating that the availability of slots was sufficient for assignment. On the other hand, the placement service 502 may provide placement information 520 indicating that an inefficient placement was made due to insufficient availability of slots of the requested type. This may provide valuable feedback to the fleet management service 510 to allow it to improve the selection of available slots allocated.

Another factor that the placement service 502 may consider in evaluating the assignment is the distribution of allocated slot assignments among computing devices. It may be beneficial to distribute the request assignments for a particular customer 506 among many computing devices rather than concentrating the request assignments on a small number of computing devices. In particular, distributing slot assignments for a customer decreases the risk that a customer will be adversely impacted as a result of a computing device becoming unresponsive or experiencing an outage. Accordingly, one factor that the placement service 502 considers in evaluating the slot assignment is whether fulfillment of the request was assigned to a computing device having one or more other jobs of the customer assigned thereto.

A further factor that the placement service 502 may consider in evaluating the slot assignment is the resource utilization of the computing device to which fulfillment of the request was assigned. Allocating all of the resources of a computing device to fulfill customer requests may be undesirable because sudden increases in resource usage to fulfill jobs may cause slowdowns or outages. On the other hand, it may be desirable to maintain a number of computing devices that have unassigned slots in the event that a customer wishes to utilize all the resources of a computing device, or to fulfill requests for a customer who has experienced outages or other adverse effects in association with the instance service. The assessment may factor whether the placement service 502 was forced to oversubscribe or fully subscribe the resources of a computing device because better alternatives were unavailable. The assessment may also factor whether the placement service 502 was forced to assign fulfillment of a request to a computing device whose resources were previously unassigned. Providing the placement information 520 may help the fleet management service 510 to make better decisions in determining what types of slots to allocate, on which computing devices to allocate slots, and which slots may need to be migrated to another computing device. Accordingly, providing feedback to the fleet management service 510 may improve customer experience and efficiency associated with the instance service.

The fleet management service 510, as a result of receiving the placement information 520, may cause a virtual machine instance to be allocated on the corresponding computing device 518. The fleet management service 510 may send a control signal 522 (e.g., on the control plane) to the corresponding computing device 518 to cause the computing device to instantiate the corresponding virtual machine instance. The control signal 522 may include a resource vector signal causing the computing device 518 to reserve specified amounts of computing resources (e.g., X amount of data storage, Y amount of memory, Z amount of processing power) sufficient to operate the virtual machine instance. The control signal 522 may further include a command causing the computing device 518 to instantiate a virtual machine having certain parameters (e.g., operating system A, programs B) corresponding to the customer request 504. The customer corresponding to the customer request 504 may be associated with the resources and virtual machine instantiated on the computing device 518.

Figure 6:
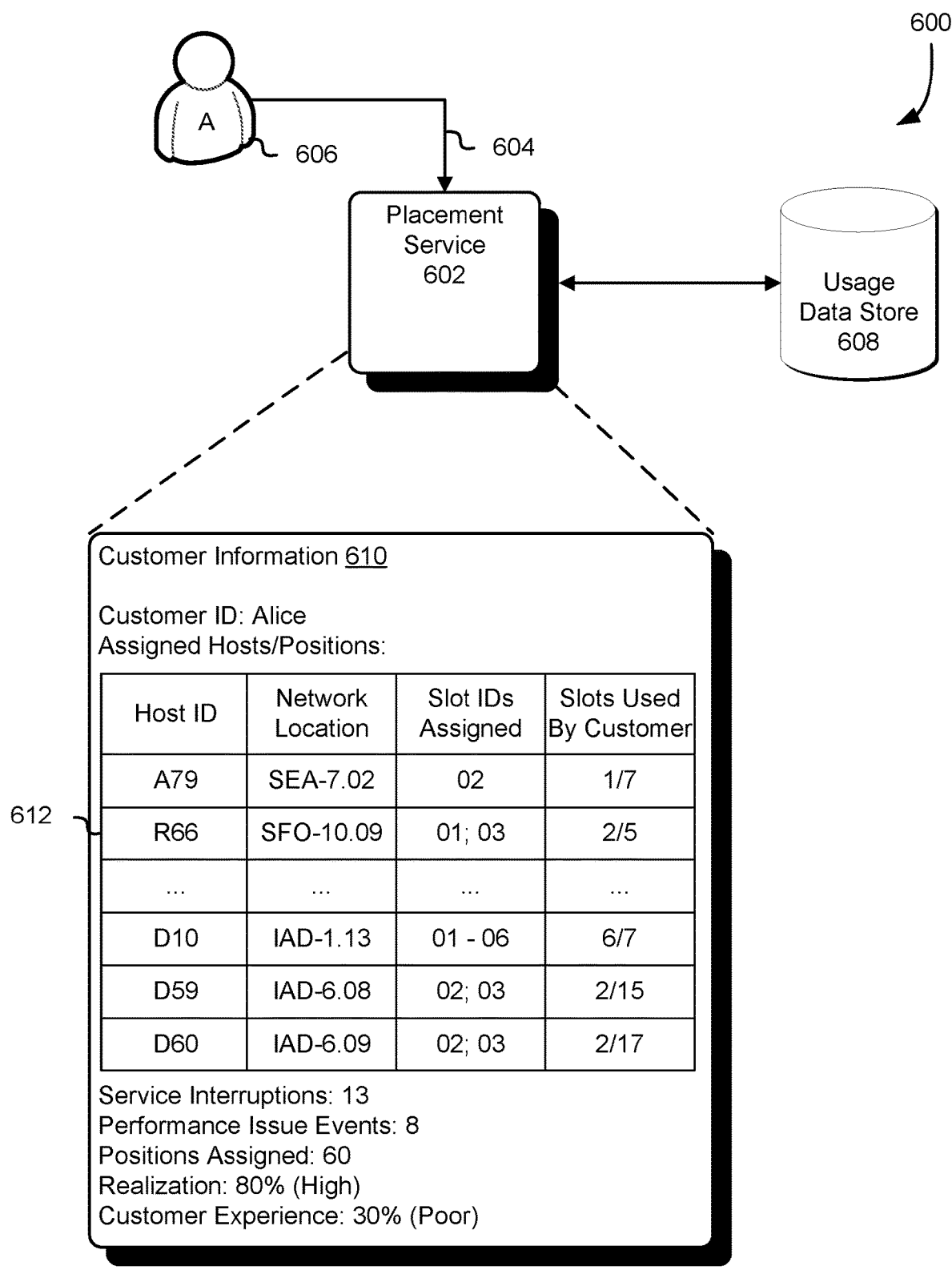
FIG. 6 illustrates an environment in which customer information is obtained in connection with assigning the compute capacity slot in accordance with an embodiment.

FIG. 6 shows an environment 600 in which customer information is evaluated to determine placement of a compute capacity slot. As described herein, a placement service 602 may receive a request 604 of a customer 606 to provision a compute capacity slot, as described herein. To determine to which allocated compute capacity slot fulfillment of the request 604 should be assigned, the placement service 602 may obtain customer information 610 including various information regarding the customer 606 and information associated with performance of the instance service with respect to slots assigned to the customer 606. The customer information 610 may be obtained from a usage data store 608.

The customer information 610 is a set of data stored in memory in association with a customer identifier (e.g., account identifier, user identifier). The customer information 610 may include a record 612 of slots assigned for fulfilling requests for the customer 606. The slot record 612 may identify host identifiers of computing devices on which the slots assigned to the customer are running, a network location of the host and/or the slot, location information of the slots on the computing devices (e.g., slot identifier), and number of slots used on each computing device.

The customer information 610 may include metrics regarding events which may impact customer experience. Such metrics may include an indication of a number of service interruptions the customer has experienced, which may correspond to system reboots or outages that the computing devices have experienced while assigned to the customer. Another metric may be regarding events that have impacted performance of the computing devices assigned to the customer, such as events where the computing devices experienced slowdown due to oversubscription of its resources. A metric regarding the overall customer experience may be included which is an evaluation of the customer's overall experience with the instance service. The customer information 610, for example, evaluates the overall customer experience for the customer 606 as "poor". Accordingly, in determining which slot should be assigned to fulfill the request 604, the placement service 602 may make an assignment that will have a low risk of adversely affecting customer performance, such as by assigning the request 604 to be fulfilled by a computing device that has few or no customer requests assigned to it. The metrics may correspond to a period of time configurable by an authorized user, such as a system administrator.

Figure 7:
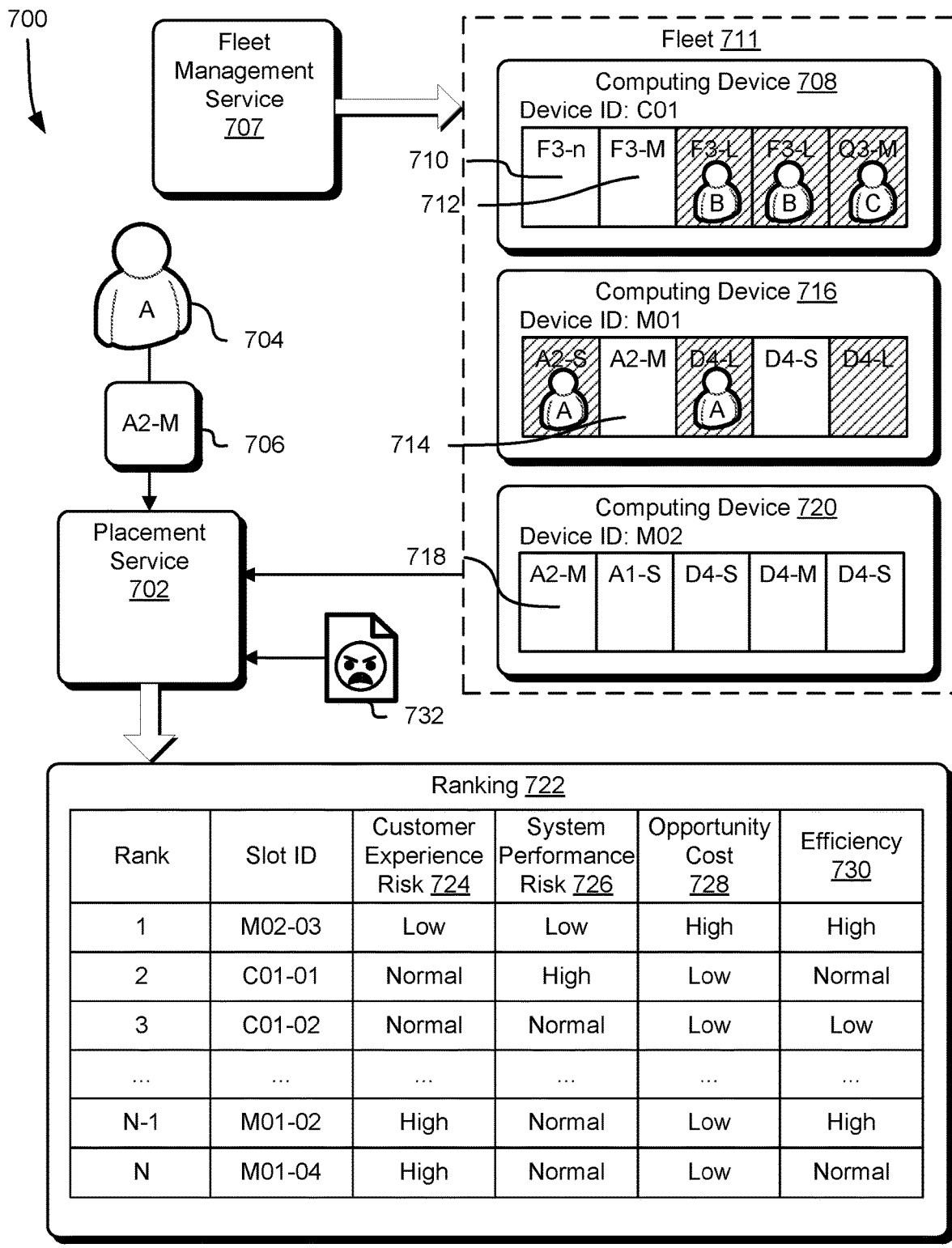
FIG. 7 illustrates a diagram associated with evaluating a set of factors in connection with selecting the compute capacity slot in accordance with an embodiment.

FIG. 7 shows an environment 700 in which a placement service may evaluate a set of slots allocated on one or more computing devices according to various embodiments described herein. A placement service 702, in response to receiving a request 706 from a customer 704 to provision a compute capacity slot, may evaluate a set of candidate slots based on a set of factors. The placement service 702 may search for slots having slot types or resource attributes that satisfy a constraint on resource attributes included in the request 706. In this example, the constraint in the request 706 is for a compute capacity slot having resource attributes and values corresponding to a specific type of compute capacity slot—namely, a type "A2-M." The placement service 702 identifies a set of candidate slots hosted on one or more computing devices that have resource attributes and corresponding values sufficient to fulfill the request 706, as described above with respect to FIG. 5, and evaluates the candidates. The candidate slots are identified from among a fleet 711 of computing devices managed by a fleet management service 707 that allocates slots corresponding to computing resources of the computing devices, as described herein. It should be noted that a heterogeneous population of slots may be allocated to individual ones of the computing devices such that individual computing devices may host different instance types.

For purposes of illustration, identification and evaluation of several candidate slots will now be described. The placement service 702 may identify, from the fleet 711, a set of candidate slots that have a sufficient amount and set of computing resources to satisfy the request 706. A first candidate slot 710 on a first computing device 708, for example, has a F3-n slot type, which may be may be a slot type having at least the same resource attributes as the requested A2-M slot type, but which may have slightly larger attribute values than the A2-M type. A second candidate slot 712 on the first computing device 708 may be a F3-M slot type which may be a slot type having at least the same resource attributes as an F3-L, but which may have much larger resource attribute amounts than the A2-M slot type. For instance, the F3-M may have higher CPU performance metrics, memory allocation, and or data storage allocation. The placement service 702 may identify a third candidate slot 714 having the requested A2-M type on a second computing device 716, and a fourth candidate slot 718 having the requested A2-M slot type on a third computing device 720.

The placement service 702 may generate a ranking 722 of the candidate slots identified to determine which candidate slot should be assigned for fulfillment of the request 706. This process may facilitate intelligent assignment of slots for fulfillment of the request 706 to improve efficiency and reduce risk associated with various factors, including customer experience and system performance. The placement service 702 may evaluate the candidate slots based on a set of rules that may involve previous customer experience, as discussed above with respect to FIG. 6, and/or slot distribution on the computing devices. For example, the set of rules may determine a rank of each candidate slot based on factors involving the number of slots on a computing device that are assigned to the customer, unassigned slots on a computing device, the concentration of slots on a computing device, and efficiency associated with assigning the request to be fulfilled by the candidate slot.

The set of rules may specify a set of rules for determining a status associated with one or more factors. For instance, the set of rules may specify conditions for determining a level of risk or efficiency associated with assigning fulfillment of a user request to a particular candidate slot. Certain conditions detected in association with an assignment may be associated with a particular level—for example, the set of rules may specify that a condition associated with a candidate slot may correspond to a "high" or increased risk for one or more factors. In one embodiment, the set of rules may specify a numerical risk or efficiency score associated with a particular condition. A risk or efficiency within a certain range may be designated as being "normal" whereas a risk above that range or above a threshold level or value may be designated as having a "high" risk or efficiency status. By contrast, a risk or efficiency below the "normal" range, or below a threshold level or value, may be designated as having a "low" status. Some factors may be determined to be more important than others; for instance, the risk of adverse customer experience may be more important than efficiency. The set of rules may also consider customer information, such as previous customer experience and the number and distribution of slot assignments for the customer.

One factor may be a risk of adverse customer experience 732 associated with assigning fulfillment of the request 706 to a particular candidate slot. The set of rules may specify that certain conditions may present an increased risk or a decreased risk of causing an adverse customer experience associated with assigning the request to the candidate slot. For slot, a high or increased risk of adverse customer experience may be associated with assigning fulfillment of the request 706 to a computing device on which the same customer has one or more slots already assigned. In the event that the computing device experiences a service interruption, such as an outage, the customer's 704 experience with the instance service may be adversely affected by causing several slots of the customer 704 to become unresponsive or unavailable. Accordingly, the set of rules may specify that the customer request 706 should not be assigned to computing devices having one or more slots assigned to the customer so as to decrease risk to the customer in the event that the computing device experiences a performance issue or service interruption. In the environment 700, the placement service 702 may determine that, based on the set of rules, candidate slots on the second computing device 716 will have a high risk of adverse customer experience because other slots on the second computing device 716 are already assigned to the customer 704. This may result in the placement service 702 assigning the third candidate slot 714 with a low ranking because, although the slot type of the third candidate slot 714 is of the requested type (A2-M), assigning the customer request 706 to the second computing device 716 may cause an increased risk of a negative experience for the customer 704. Accordingly, the third candidate slot type 718 is indicated as having a low rank in the ranking 722. On the other hand, the fourth candidate slot 718 has a low risk of adverse customer experience because no other slots are hosted on the third computing device 720.

Another factor may be efficiency 730 associated with assigning fulfillment of the request 706 to a candidate slot. The set of rules may specify that certain conditions are associated with a corresponding level of efficiency. For example, matching a request to the particular slot type associated with the request may be associated with a high or increased efficiency. Conversely, assigning fulfillment of a request to a slot having a type whose resource attribute values exceed the resource attribute values of the request may be associated with a low efficiency. The set of rules may include one or more rules specifying that a customer request should not be assigned to a location that would be inefficient, such as where the attribute values for one or more resource attributes are much greater than the attribute values for the requested slot type. In the environment 700, the second candidate slot 712 may have a relatively low ranking because the slot type F3-M of the second candidate slot 714 is associated with attribute values much greater than the requested slot type of A2-M. The first candidate slot 712, by contrast, is ranked relatively high because the attribute values for a F3-$n$ slot type may be similar to an A2-M slot type. Accordingly, selecting the first candidate slot 712 to fulfill the request 706 may result in better efficiency versus selection of a slot having the F3-M type.

A further factor may be the system performance risk 726 associated with assigning fulfillment of the request 706 to a candidate slot. The set of rules may specify that certain conditions may be associated with an increased or decreased risk of adverse system performance. An increased risk of performance lag or interruption may be associated with a condition where a significant portion of the computing resources of a computing device are already assigned to fulfill requests. For a computing device computing resources of a device having a large portion of one or more of its resources subscribed to customers, a sudden spike may cause a drop or slowdown in system performance for some slots on the computing devices. Assigning the request 706 to the first candidate slot 710 may be associated with an increased risk to system performance because a significant portion of the computing resources of the computing device 708 are assigned to customers.

Yet another factor may be the opportunity cost 728 associated with assignment of a request. The set of rules may specify that a high opportunity cost is associated with assigning slots to a computing device that has a high concentration of unused slots. In particular, it may be desirable to reserve computing devices having few or no used slots for customers who wish to use all or most of the slots available on a computing device, or for customers who have been adversely impacted by service interruptions or performance issues. For example, the fourth candidate slot 718 may be associated with a high opportunity cost because there are no slots of the computing device 720 currently assigned. The set of rules may conversely specify that a low opportunity cost is associated with assigning a request to a computing device having one or more slots already assigned.

The placement service 702 may balance these and other factors to determine how to rank or evaluate assignment of the candidate slots. Some factors may have more weight in the evaluation than others—for example, the risk of adverse customer experience 724 may be more significant than the performance risk 726. Based on the ranking 722, the placement service 702 may make a decision on which slot to assign fulfillment of the request 706. The placement service 702 may consider other information in determining which candidate slot to assign the request 706 to, such as customer information 732 corresponding to the customer information described in FIG. 6. The placement service 702 may consider that the customer information 732 indicates that the customer 704 has had a poor customer experience with the instance service in the past. The set of rules may indicate that the request 706 should be assigned to a candidate slot that will improve the customer's experience with the instance service. The placement service 702 may determine that, although the opportunity cost 728 associated with assigning fulfillment of the request 706 to the fourth candidate slot 718 is high, the assignment to the fourth candidate slot 718 would have a low risk of adverse customer experience. The placement service 702 may therefore determine that assignment of the request 706 to the fourth candidate slot 718 would likely help to improve the customer's 704 experience and ensure that the customer 704 will not suffer further adverse effects due to performance issues or service interruptions. Accordingly, the placement service 702 may determine to assign the customer request 704 to the fourth candidate slot 718 based on the rankings 722. After assignment, the placement service 702 may update the rankings to remove the fourth candidate slot 718 from consideration for future placements for the customer 704. The placement service 702 may also may send a notification to the fleet management service 707 indicating various information about the placement. The notification may indicate information regarding the population of instances types in the fleet 711, or indicate information regarding the appropriateness of the placement. For instance, the notification may indicate that there are no desirable A2-M type candidate slots remaining for the customer 704.

The placement service 702 may also concurrently evaluate a plurality of pending requests of different customers to optimize placement. Evaluating the plurality of pending requests may include considering various factors described herein to determine the best placement for the pending requests from among a set of possible solutions, as described below with respect to FIG. 10. The placement service 702 may determine that it may be optimal to assign a customer request of a first customer to a slot over the request of another customer to alleviate adverse customer experience of the first customer. The placement service 702 may determine that it is optimal to assign a request of a second customer to a slot that is in close network proximity to other slots assigned to the customer, which may improve the performance of the computing resources. The placement service 702 may assign fulfillment of a third customer request to a computing device having a large amount of compute resources unassigned (e.g., a computing device with all or most slots unassigned). This assignment may be preferred where a customer has few slots and the unavailability of one slot may greatly affect the customer's experience, or where the customer has a high degree of customer pain associated with the instance service. Customer pain may be associated with reboots of a computing device, oversubscription, network traffic, etc. Assignment may include migrating assignments of a customer from one slot to another. In general, the placement service 702 may employ a comprehensive approach to consider all pending requests and determine the most optimal combination of placements, considering the rankings generated for each customer, customer pain (e.g., adverse customer experiences), and other factors described herein.

Figure 8:
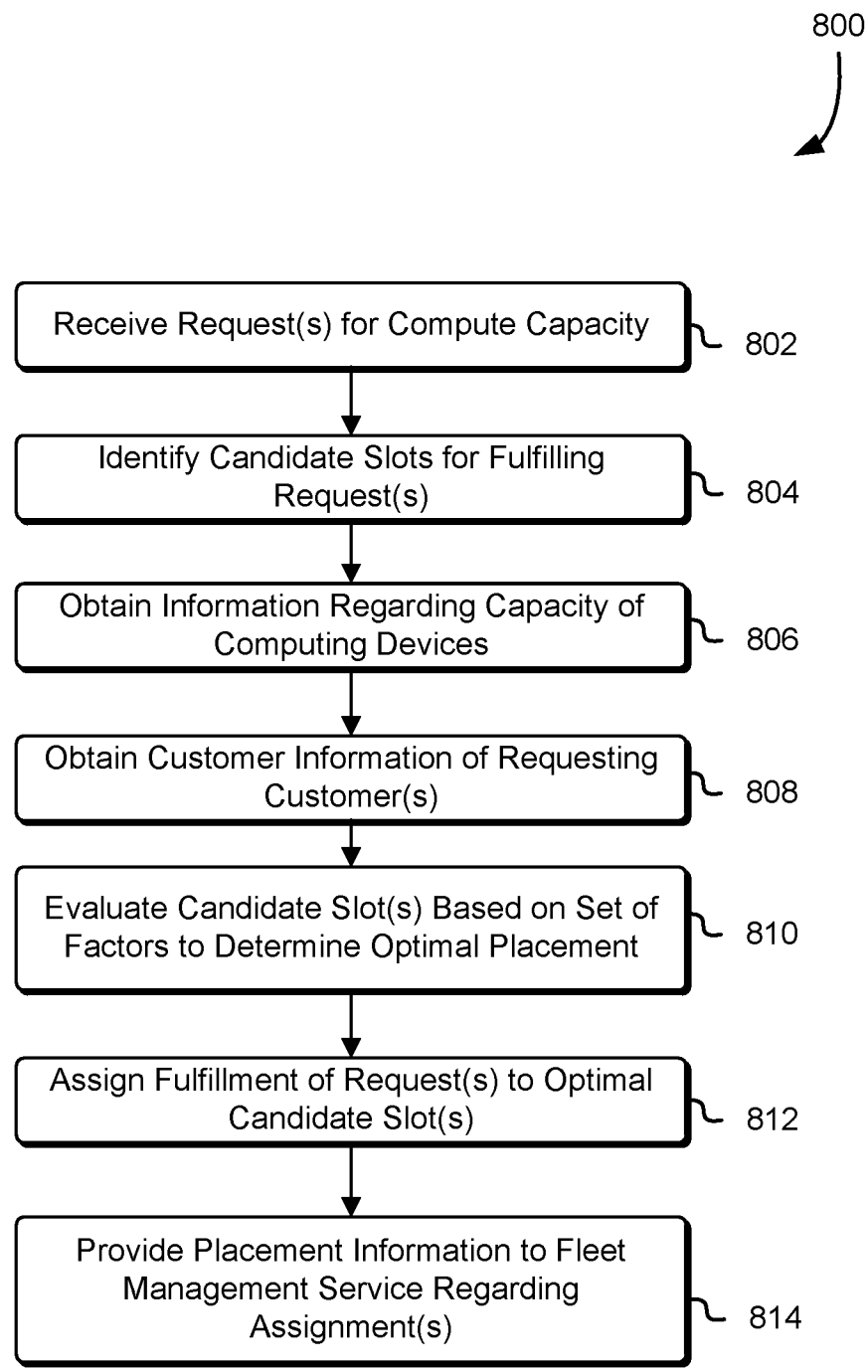
FIG. 8 illustrates a process for assigning a slot of a set of candidate compute capacity slots to fulfill a customer request in accordance with an embodiment.

FIG. 8 shows a process 800 for assigning requests to compute capacity slots according to various embodiments. The process 800 may be performed by any appropriate service provider entity described herein, such as the placement service. The process begins by receiving 802 one or more requests to provide a compute capacity slot from a customer, as described above with respect to FIGS. 1, 2, 5, 6, and 7. The one or more requests may include requests from multiple customers, where each customer is requesting a plurality of compute capacity slots. The placement service may then identify 804 candidate slots having a set of resource attributes and corresponding values satisfying a constraint on resource attributes associated with the request, as described above with respect to FIGS. 1, 2, 4, 5, and 7. The candidate slots may be identified from a population of slots allocated by an entity of the service provider, such as the fleet management service described herein, and using information obtained regarding the population of slots. The placement service may then obtain 806 information regarding the computing devices hosting the candidate slots. The information regarding the computing devices may include the number of slots assigned to the customer that each computing device is hosting and the number of unassigned slots on each computing device. The placement service may also obtain 808 customer information regarding the customer submitting the request, as described above with respect to FIGS. 6 and 7. The customer information may include previous customer experience (e.g., customer satisfaction), information regarding existing customer slot assignments, and realization information regarding how much of the resources allocated the customer uses.

The placement service may evaluate 810 the candidate slots based on a set of factors described above with respect to FIG. 7. The evaluation may include generating a ranking that involves determination of risk, efficiency, cost, etc. associated with assigning the request to individual ones of the candidate slots. The evaluation may further include consideration of various aspects of the customer information, such as customer experience, and distribution and number of slots assigned to the customer. Based on a result of the evaluation, the placement service may assign 812 fulfillment of the request to one of the candidate slots. Optionally, the placement service may generate information regarding the appropriateness of the assignment, including the risk or efficiency associated with the assignment of the request. The placement service may then provide 814 placement information regarding the assignment to an appropriate entity, such as the fleet management service.

Figure 9:
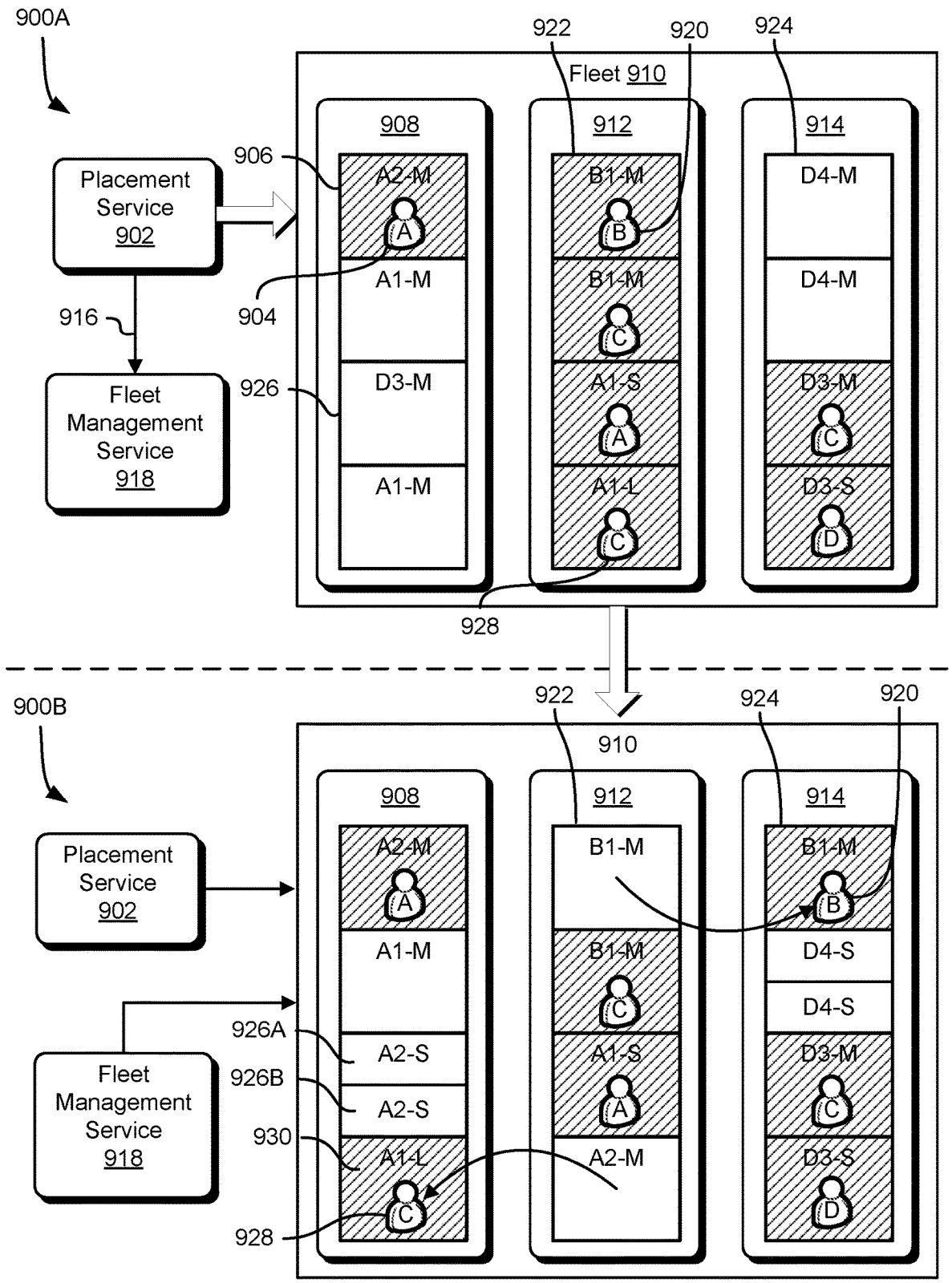
FIG. 9 illustrates a diagram for managing a fleet of physical hosts and computer system instances.

FIG. 9 shows a diagram 900 illustrating management of a fleet of physical hosts and computer system instances according to one or more embodiments described herein. In a first state 900A, a placement service 902 assigns fulfillment of a user request 904 to a slot 906 of a computing device 908 of a fleet 910 of computing devices. As described above, the assignment of the user request 904 may be based on various factors, such as previous customer experience. Other computing devices, such as second computing device 912 and a third computing device 914 of the fleet 910, may be assigned to fulfill other user requests and may have slots that are unassigned. The placement service 902 may provide placement information 916 to a fleet management service 918 regarding the assignment of the user request 904. For instance, the placement information 916 may include identifying information of the request 904 (e.g., user identification information) in association with slot identification information of the slot 906 and/or identification information of the computing device 908 to indicate that the user request 904 was assigned to the slot 906. The placement information 916 may include information regarding the assignment of the user request 904, such as the slot and computing device to which the user request 904 was assigned. Such placement information 916 may further indicate the quality of the assignment, such as information indicating that the placement service 902 was forced to make a placement that failed to satisfy one or more criteria related to the aforementioned factors (e.g., efficiency, risk, opportunity cost, network efficiency) due to the available selection of slots. The fleet management service 918 may update information regarding the fleet 910, such as fleet data stored in the fleet data store described herein. The fleet data may include data corresponding to the number of each instance type and size in the fleet 910, distribution information of the user requests to computing devices, realization of computing resources of the computing devices (e.g., how much of the computing resources of each computing device is being utilized, particular computing devices at risk of oversubscribing computing resources), network proximity of computing devices, efficiency of user request assignments, and so forth.

The fleet management service 918 may monitor the fleet 910 and analyze aspects thereof to determine changes to be made to the fleet 910. Changes to the fleet 910 may be made based at least in part on placement information 916 by the placement service 902. Changes to the fleet 910 may also be made independent of placement information 916, such as by analyzing the fleet data. The management service 918 may evaluate aspects of the fleet including the number of instance types available in the fleet 910; the desirability of the instance types (e.g., how popular to customers instance types are); the network proximity of slots assigned to a customer, such as whether slots are in the same computing device, same network spine, same datacenter, or the same region; risk of adverse customer experience; the efficiency of assignments; or other aspects described herein. In general, the fleet management service 918 evaluates the fleet 910 in a comprehensive manner to determine changes that may be made to improve efficiency and lower risk. One example of a change that may be made to the fleet is changing one instance type to another instance type, including changing the size of a slot to a different size (e.g., A1-L to an A1-M), subdividing a slot of an instance type into a plurality of slots, or merging or combining slots. A further example may include migrating an assignment of a user request from one slot to another. Yet another example may include creating new slots of particular instance types as new computing resources become available (e.g., as new computing devices are made available, previously used slots become unassigned).

Evaluations and changes that the fleet management service 918 may employ will now be described with respect to FIG. 9. The factors the fleet management service 918 may consider in determining changes to the fleet 910 may be related to customer experience, system performance, efficiency, and/or opportunity cost. In one embodiment, the fleet management service 918 may determine that a customer should be migrated from one slot to another. In the first state 900A, for instance, the fleet management service 918 may determine that a system performance risk is associated with the computing device 912 due to the ratio of assigned/unassigned slots thereof exceeding a threshold, or that a risk of oversubscription is associated with the computing device 912 (e.g., too much of the computing resources being allocated). Accordingly, the fleet management service 918 may, in a second state 900B, convert a slot 924 of the computing device 914 from one instance type to another to allow the customer to be reassigned. The slot 924 may be converted from a "D4-M" instance type to a "B1-M" instance type. The fleet management service 918 may then notify the placement service 902 of the change, and the placement service 902 may reassign the customer 920 from the slot 922 to the slot 924 to alleviate risk.

In one embodiment, the fleet management service 918 may determine that more slots of an instance type should be available based, for example, on the risk of adverse customer experience, the number of available slots of an instance type and/or the popularity of the instance type to customers. In the state 900A, the fleet management service may determine that a sufficient number of "A2-M" and "A2-S" are not available. Therefore, the fleet management service 918, in the second state 900B, may determine to convert a slot 926 from an instance type of "D3-M" into two slots 926A and 926B of instance type "A2-S". The fleet management service 918 may also reassign customers to slots to improve efficiency, such as by assigning the customer to a slot having an instance type that matches, or is a better fit for, the instance type requested.

As another example, in the first state 900A, the fleet management service 918 may determine that there is a risk of adverse customer experience to the customer 928 because more than one requests of the customer 928 are assigned the same computing device 912. Accordingly, the fleet management service 918 and placement service 902 may coordinate to reassign fulfillment of customer requests to different slots. The fleet management service 918 may, in the second state 900B, change the instance type of one or both of the assignor and assignee slots—for example, the slot 930 of the computing device 908 may be changed to the instance type "A1-L" to match the instance type that the customer 928 requested. The placement service 902 may then reassign the fulfillment of one of the customer requests 928 to the slot 930 of the computing device 908. In one embodiment, the fleet management service 918 may determine to convert a slot of one instance type to another to improve customer experience. For example, the assignor slot of the computing device 912, from which the customer 928 was reassigned, may be changed from a type "A1-L" to a type "A2-M" to increase the number of slots available of desirable instance type. Changes to the fleet 910 to improve customer experience may be based on the placement information 916 received from the placement service 902, such as adding slots to address deficiencies in the available selection of slots. After changing instance types or changing slots from one instance type to another, the placement service 918 may notify the fleet management service 902 of the changes to the fleet 910.

Figure 10:
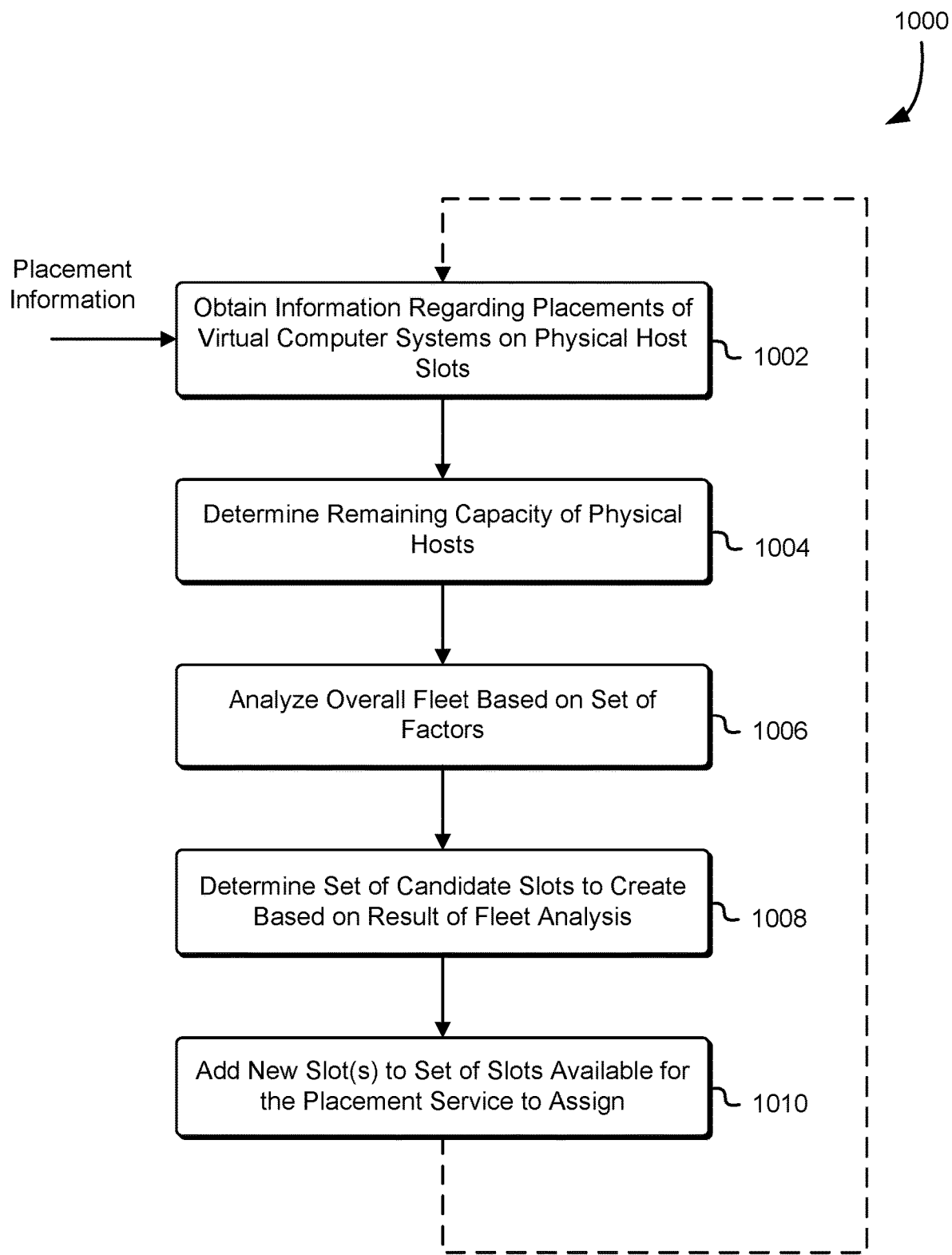
FIG. 10 illustrates a process for managing slots on a fleet of physical hosts.

FIG. 10 shows a process 1000 for constructing slots on a set of computing devices according to various embodiments disclosed herein. The process 1000 may be performed by any appropriate computing system entity described herein, such as the fleet management service. The process 1000 may be performed asynchronously to the process 800; however, the fleet management service and the placement service may communicate or coordinate in one or more steps. The process 1000 begins by obtaining 1002 information regarding placements of virtual computer systems among a set of physical hosts. Placements of the virtual computer systems may correspond to assigning customers to virtual computer systems operating on one or more computing devices, where the virtual computer systems are assigned to slots of the computing devices. The virtual computer systems may include virtual computer system instances (e.g., virtual machine instances) instantiated on the virtual computer systems. Obtaining the placement information may include obtaining, from the fleet data store, fleet data regarding virtual computing system instances instantiated on slots of the computing devices. The placement information may also include feedback information provided from the placement service to the fleet management service regarding assignments of customers to the systems. The placement information may indicate various information regarding the placement and/or the virtual computer systems, such as information regarding virtual computer system instance types instantiated on the physical hosts, including an instance type (e.g., A2-M, A1-S) of a virtual machine instance instantiated on a slot. The instance type may correspond to computing resource attributes and resource attribute amounts. The information provided may include information regarding resource attributes of the slots, customer information, or constraint information associated with the request (i.e., instance type requested), by way of non-limiting example. As a result of obtaining the placement information, the fleet management service may send a control signal to one or more computing devices to allocate resources and instantiate virtual machine instance, as described herein.

The process 1000 proceeds by determining 1004 the remaining capacity of one or more physical hosts in the fleet of physical hosts (e.g., computing devices). Determining the remaining capacity may include detecting the capacity such as by communicating with a physical host to determine resource vector information. The resource vector information may include the available resource vector information, the total resource vector information, and information regarding computing resources already reserved on the physical hosts. As discussed herein, capacity of a physical host may be affected by virtual computer systems added to a host (e.g., adding a new slot, instantiating a virtual machine instance), terminating virtual computer systems (e.g., shutting a virtual machine instance down, releasing resources of a physical system), migrating virtual computer systems and/or slots, and so forth.

The fleet management service may then analyze 1006 the overall fleet to determine whether the slots on one or more physical hosts satisfy a set of criteria for the fleet of physical hosts. The set of criteria may include criteria regarding efficiency, constraints regarding risk of adverse customer experience, constraints regarding opportunity cost, and/or constraints regarding risk to system performance, by way of non-limiting example. The criteria may correspond to the set of factors discussed above with respect to FIG. 7, such as whether an increased risk of adverse customer experience is associated with a placement. The criteria may include factors regarding a number of each instance type that should be maintained as being available in the fleet, or a number of empty hosts (e.g., having no slots assigned) that should be maintained as being available.

Analyzing may include assigning slots to the capacity of a physical host determined in step 1004 to optimize compliance with one or more constraints. Assigning slots may correspond to determining the effects of hypothetically placing a slot to determine whether the placement will produce a condition that satisfies one or more of the constraints. A plurality of the slots may comprise multiple types of slots such that one slot on a physical host is of a different type than another slot on the same host. Each slot type may correspond to a particular type of virtual machine instance that can, is, or will be instantiated on a slot.

Based on results of the analysis in step 1006, the fleet management service may determine 1008 a set of candidate slots to create. Information about the fleet can be encoded into an optimization algorithm to find a solution of slots to create that is optimal. Variables and parameters associated with the algorithm may include a number of total slots (both used and unused), a number of slots of each instance type that have already been assigned, adverse customer experience based on current or previous placements. The set of slots may be determined using various methods to solve constrained optimization associated with the assignment of customers to slots. In one embodiment, a penalty function may be used to influence the system toward optimization—for instance, by solving a series of unconstrained functions whose solutions converge to determine a solution for which slot or slots to determine. In one embodiment, probabilistic methods may be used to determine the slot or slots, such as by using a simulated annealing method or a gradient descent method to find a solution for determining the slot or slots.

The fleet management service may then add 1010 the one or more slots determined in step 1008 available to the placement service described herein. Adding the slots may correspond to making the one or more slots available by, for example, reserving a set of resources and corresponding resource amounts on a physical host such that the set of resources are inaccessible by computing entities unless otherwise authorized or enabled to do so by the fleet management service. Making the one or more slots available may further include adding the one or more slots to a set of slots available to be used for instantiating and hosting virtual machine instances. Various slot information may be generated and associated with the reserved set of resources and corresponding resource amounts, such as information indicating one or more slot identifiers and instance type information. The slot information may be stored in data storage, such as the fleet data store described above. Making the one or more lots available may include providing the slot information to the placement service and enabling the placement service to assign the slot to a customer for fulfillment of the request. The process may then return to step 1002 to obtain placement information regarding one or more slots, such as receiving placement information from the placement service regarding assignment of one or more customers to corresponding ones of the slots.

Figure 11:
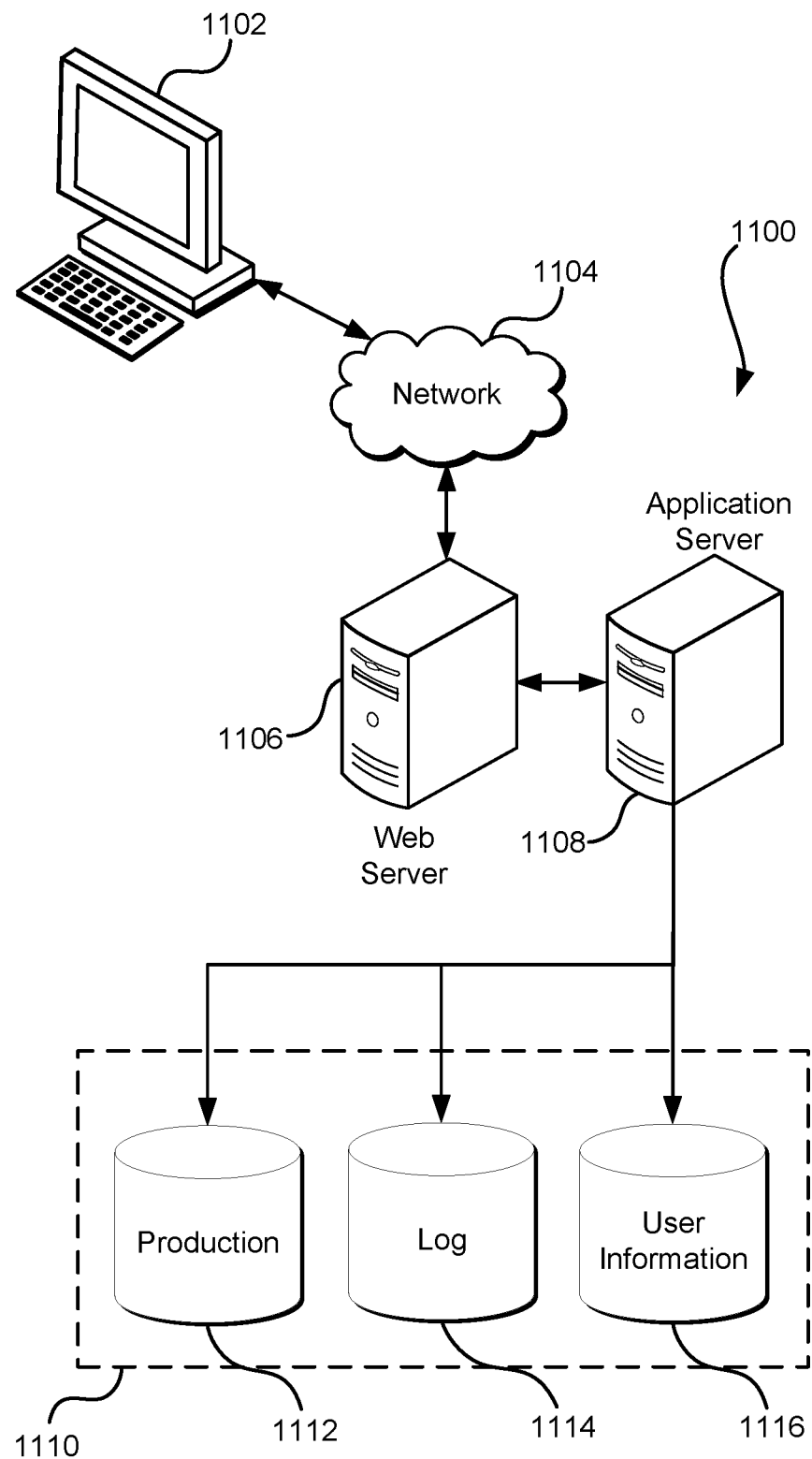
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1100 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For example, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory storing computer-executable instructions that, as a result of execution, cause the system to:
   detect capacity of a computing system in a plurality of computing systems;
   determine, based at least in part on information from a placement service that is indicative of at least one or more identified adverse performance events that are associated with one or more instantiations of compute instances on the plurality of computing systems, a first slot for a first type of compute instance and a second slot for a second type of compute instance to be instantiated on the computing system of the plurality of computing systems, the first type of compute instance and the second type of compute instance having different associated computing resource values; and
   add at least the first slot and the second slot to a group of slots to be used by the placement service to instantiate a first compute instance that matches the first type and a second compute instance that matches the second type.

2. The system of claim 1, wherein the computer-executable instructions further cause the system to:
   obtain further information indicating instantiation of the first compute instance on the first slot;
   determine a third slot for the first type of compute instance, the third slot being located on a second computing system of the plurality of computing systems; and
   cause the first compute instance to be moved to the third slot.

3. The system of claim 2, wherein causing the first computing instance to move to the third slot is as a result of a determination that the first compute instance is associated with a violation of a constraint for the group of slots.

4. The system of claim 1, wherein the computer-executable instructions further cause the system to determine a third slot for a third type of compute instance to be instantiated on the computing system, the third slot comprising at least a portion of the first slot.

5. The system of claim 1, wherein:
   the plurality of computing systems are managed at least in part by a computing resource service provider; and
   the information further indicates a first amount of first slots and a second amount of second slots that are used to perform computing operations on behalf of one or more customers of the computing resource service provider.

6. The system of claim 1, wherein the computer-executable instructions further cause the system to:
   determine, based at least in part on a plurality of requests received by the placement service requesting instantiation of a plurality of compute instances, a plurality of slots of the plurality of systems satisfying criteria for system performance; and
   add the plurality of slots to the group of slots.

7. The system of claim 1, wherein at least one of the first slot and the second slot are determined based at least in part on customer information indicating an adverse customer experience associated with a compute instance instantiated by the placement service.

8. The system of claim 1, wherein adding at least the first slot and the second slot is performed asynchronously to instantiating the first compute instance and the second compute instance.

9. A non-transitory computer-readable storage medium having stored thereon executable instructions that, as a result of being executed by one or more processors of a computer system, cause the computer system to at least:
   obtain, by a placement service, information that is indicative of at least one or more identified adverse performance events that are associated with one or more instantiations of compute instances on a plurality of computing systems;
   determine, based at least in part on the information, a first slot for a first type of compute instance and a second slot for a second type of compute instance to be instantiated on a computing system of the plurality of computing systems, the first type of compute instance and the second type of compute instance having different associated computing resource values; and
   add at least the first slot and the second slot to a group of slots to be used by the placement service to instantiate a first compute instance that matches the first type and a second compute instance that matches the second type.

10. The non-transitory computer-readable storage medium of claim 9, the instructions further comprise instructions that, as a result of being executed by the one or more processors, cause the computer system to obtain further information regarding a compute instance instantiated on a slot of the group of slots, wherein the further information indicates a violation of a constraint associated with the group of slots.

11. The non-transitory computer-readable storage medium of claim 10, wherein the information further indicates that the instantiation of the compute instance violates a constraint associated with resource allocation efficiency, and adding at least one of the first compute instance and the second compute instance improves a condition related to resource allocation efficiency.

12. The non-transitory computer-readable storage medium of claim 10, wherein the information further indicates that the instantiations of compute instances violate a constraint associated with a risk of adverse customer experience, and adding at least one of the first compute instance and the second compute instance decreases the risk of adverse customer experience.

13. The non-transitory computer-readable storage medium of claim 9, wherein the information further indicates that the instantiations of compute instances violate a constraint associated with a number of compute instances of at least one of the first type and the second type, and adding at least one of the first compute instance and the second compute instance improves a condition related to a supply of compute instances.

14. The non-transitory computer-readable storage medium of claim 9, the instructions further comprise instructions that, as a result of being executed by the one or more processors, cause the computer system to detect a capacity of the computing system in the plurality of computing systems, wherein detecting the capacity of the computing system includes obtaining information indicating an amount of available computing resources of the computing system remaining to be allocated.

15. The non-transitory computer-readable storage medium of claim 14, wherein determining the first slot and the second slot includes a determination that utilizing the first slot and the second slot on the computing system to perform computing operations will not cause a violation of a constraint related to oversubscription of the amount of available computing resources.

16. The non-transitory computer-readable storage medium of claim 9, wherein the instructions further cause the computer system to:
determine a third slot for the first type of instance; and
move the first compute instance to the third slot based on obtaining information indicating that the first compute instance is associated with a violation of a constraint for the group of slots.

17. A computer-implemented method, comprising:
identifying a computing system of a plurality of computing systems;
determining, based at least in part based at least on instantiations of compute instances on the plurality of computing systems, a first slot for a first type of compute instance and a second slot for a second type of compute instance to be instantiated on the computing system of the plurality of computing systems, wherein the first type of compute instance and the second type of compute instance are associated with different computing resource values;
adding at least the first slot and the second slot to a group of slots to be used by a placement service to instantiate a first compute instance that matches the first type and a second compute instance that matches the second type;
receiving a request to instantiate a compute instance associated with an instance type;
selecting, based at least in part on matching the instance type to the first type or the second type, a slot from the first slot and the second slot to fulfill the request; and
causing a request to launch the compute instance on the selected slot to be sent to the computing system, the request to launch the compute instance including a resource vector indicating an amount of resources to use to instantiate the compute instance, wherein the amount of resources is associated with the selected slot.

18. The computer-implemented method of claim 17, wherein adding at least the first slot and the second slot to the group of slots includes updating, in data storage, a record of computing resources of a fleet of physical hosts, the record indicating that computing resources corresponding to the first slot and the second slot are reserved for instantiating the first type and the second type of compute instance, respectively.

19. The computer-implemented method of claim 18, further comprising subsequent to selecting the slot, updating the record to indicate that one or more computing resources corresponding to the selected slot are occupied by the compute instance.

20. The computer-implemented method of claim 17, further comprising:
wherein:
the request to instantiate the compute instance associated with the instance type is from a customer; and
the computing system is identified based at least in part on an identification of the customer; and
as a result of determining that instantiating the compute instance on the selected slot violates at least a constraint pertaining to the plurality of computer systems, determining an additional slot on a different computer system of the plurality of computer systems to use to instantiate the compute instance.

* * * * *